(12) United States Patent
Aprile et al.

(10) Patent No.: US 12,476,381 B2
(45) Date of Patent: Nov. 18, 2025

(54) INNOVATIVE THREE-DIMENSIONAL U-SHAPED ARCHITECTURE FOR TRANSMIT/RECEIVE MODULES OF AESA SYSTEMS

(71) Applicants: LEONARDO S.P.A., Rome (IT); Michele D'Urso, Naples (IT)

(72) Inventors: Angelo Aprile, Pomezia (IT); Giorgio Isella, Pomezia (IT); Eleonora Troysi, Pomezia (IT); Giovanni Vertemati, Pomezia (IT); Dario Meledandri, Pomezia (IT); Alfonso Breglia, Pomezia (IT); Ersilio Vannicola, Pomezia (IT)

(73) Assignee: LEONARDO S.P.A., Rome (IT)

( * ) Notice: Subject to any disclaimer, the term of this patent is extended or adjusted under 35 U.S.C. 154(b) by 382 days.

(21) Appl. No.: 18/250,400

(22) PCT Filed: Oct. 29, 2021

(86) PCT No.: PCT/IB2021/060038
§ 371 (c)(1),
(2) Date: Apr. 25, 2023

(87) PCT Pub. No.: WO2022/091026
PCT Pub. Date: May 5, 2022

(65) Prior Publication Data
US 2024/0030621 A1    Jan. 25, 2024

(30) Foreign Application Priority Data
Oct. 29, 2020   (IT) .................. 102020000025723

(51) Int. Cl.
*H01Q 21/00*     (2006.01)
*H01Q 21/20*     (2006.01)
*H04B 7/06*      (2006.01)

(52) U.S. Cl.
CPC ......... *H01Q 21/0025* (2013.01); *H01Q 21/20* (2013.01); *H04B 7/0617* (2013.01)

(58) Field of Classification Search
CPC ... H01Q 21/0025; H01Q 21/20; H04B 7/0617
See application file for complete search history.

(56) References Cited

U.S. PATENT DOCUMENTS 6,611,430 B1 * 8/2003 Richard ............. H01Q 21/0087
                                                        174/16.3
6,975,267 B2   12/2005 Stenger et al.
(Continued)

FOREIGN PATENT DOCUMENTS

EP   2368291 A1    9/2011
EP   2368291 B1 * 11/2015 ............... H01Q 1/02
(Continued)

OTHER PUBLICATIONS

International Preliminary Report on Patentability for International Application No. PCT/IB2021/060038 mailed Jan. 26, 2023.
(Continued)

*Primary Examiner* — Seokjin Kim
(74) *Attorney, Agent, or Firm* — Ballard Spahr LLP

(57) ABSTRACT

The invention concerns an active electronically steerable antenna including: a planar or quasi-planar radiating array configured to transmit and/or receive radiofrequency or microwave signals, and a plurality of three-dimensional U-shaped modules, each arranged behind, and coupled to, a respective planar or quasi-planar radiating subarray of N radiating elements arranged in two rows or columns, each of N/2 radiating elements, N being an even integer. Each three-dimensional U-shaped module comprises: a respective base wall; two respective side walls that are orthogonally arranged with respect to the respective base wall so as to form therewith a respective three-dimensional U-shaped
(Continued)

structure, and are arranged, each, behind a respective row or column of N/2 radiating elements of the respective planar or quasi-planar radiating subarray; and respective transmit and/or receive electronics distributed on said respective base and side walls and configured to implement N respective transmit and/or receive modules. For each three-dimensional U-shaped module, the respective transmit and/or receive electronics includes: for each respective side wall, N/2 respective transmission and/or reception front-end modules that are mounted on said respective side wall, are coupled to the N/2 radiating elements of the respective row or column of the respective planar or quasi-planar radiating subarray, and are configured to implement power amplifiers, low noise amplifiers, and switches or circulators; and respective base wall electronics mounted on the respective base wall, connected to the N respective transmission and/or reception front-end modules and configured to carry out beam steering functions including signal phase-shifting, and attenuation and/or amplification functions.

14 Claims, 14 Drawing Sheets

(56) References Cited

U.S. PATENT DOCUMENTS

| | | | | |
|---|---|---|---|---|
| 7,132,990 | B2* | 11/2006 | Stenger | H01Q 21/0087 343/754 |
| 7,289,327 | B2 | 10/2007 | Goodwin et al. | |
| 7,859,835 | B2 | 12/2010 | Puzella et al. | |
| 8,355,255 | B2 | 1/2013 | Cheyne et al. | |
| 8,937,574 | B2* | 1/2015 | Edward | H01Q 21/0025 342/368 |
| 9,161,478 | B2 | 10/2015 | Pierides et al. | |
| 9,172,145 | B2 | 10/2015 | Puzella et al. | |
| 2003/0156060 | A1* | 8/2003 | Revankar | G01S 7/032 342/372 |
| 2008/0150832 | A1* | 6/2008 | Ingram | H01Q 21/0087 343/893 |
| 2008/0209931 | A1 | 9/2008 | Stevens | |
| 2009/0231197 | A1* | 9/2009 | Richards | H01Q 3/2682 342/377 |
| 2017/0323843 | A1 | 11/2017 | Ganguly et al. | |
| 2022/0094031 | A1* | 3/2022 | Micovic | H01Q 3/2617 |
| 2023/0065622 | A1* | 3/2023 | Micovic | H01L 25/0657 |

FOREIGN PATENT DOCUMENTS

| | | |
|---|---|---|
| WO | 2014206578 A2 | 12/2014 |
| WO | 2016065485 A1 | 5/2016 |

OTHER PUBLICATIONS

International Search Report and Written Opinion from International Application No. PCT/IB2021/060038 mailed Jan. 28, 2022.
Second Written Opinion from International Application No. PCT/IB2021/060038 mailed Oct. 14, 2022
Ganis, "Architecture and Algorithms for the Signal Processing of Advanced MIMO Radar Systems", University of Udine, Faculty of Engineering and Architecture, URL:httpsL//core.ac.uk/download/pfd/195748925.pdf last accessed Aug. 25, 2021, 251 pages.

\* cited by examiner

180
INNOVATIVE THREE-DIMENSIONAL U-SHAPED ARCHITECTURE FOR TRANSMIT/RECEIVE MODULES OF AESA SYSTEMS

CROSS-REFERENCE TO RELATED APPLICATIONS

This patent application is a U.S. National Stage of PCT International Application No. PCT/IB2021/060038 filed on Oct. 29, 2021, which claims priority from Italian patent application no. 102020000025723 filed on Oct. 29, 2020, the entire disclosure of each of which is incorporated herein by reference.

TECHNICAL FIELD OF THE INVENTION

The present invention relates, in general, to Active Electronically Steered (or Steerable) Antennas (AESAs)—sometimes also called Active Electronically Scanned Arrays and, more specifically, to an innovative three-dimensional (3D) U-shaped architecture for Transmit and/or Receive (T/R) modules of AESAs, in particular planar or quasi-planar AESAs.

STATE OF THE ART

As is known, nowadays there is a growing need for systems that offer higher levels of flexibility, integration and functionality for a wide range of radar, communication, data link and Electronic Warfare (EW) applications, thereby boosting ongoing demand for low-cost, compact and modular AESA solutions.

In particular, one of the most significant current trends of electronic equipment is related to the increase in system integration, flexibility and functionalities in order to achieve:
- weight reduction and miniaturization to allow equipping platforms with a complete sensors suite to accomplish missions characterized by high-demanding operational performance and requirements;
- cost reduction; and
- low thickness and low impact on platform shape.

These aspects are particularly important for unmanned airborne platforms for which payloads size, weight and power consumption are severe limiting factors.

Anyway, these aspects are also very meaningful for, and applicable to, any other type of platforms.

In this connection it is worth noting that if, on the one hand, systems based on AESA technology represent the only suitable solution to meet market requirements, on the other hand, traditional AESA systems are bulky and certainly not thin, and highly demanding in terms of cooling, power supply and weight requirements.

FIG. 1a) depicts an example of a traditional AESA architecture. In particular, FIG. 1a) is an exploded view of a traditional planar AESA whose main parts typically include:
- a Plank assembly, which represents a front-loading part of the AESA and provides controlled transmission and reception of radiofrequency (RF) signals via Transmit and/or Receive (T/R) modules (hereinafter also referred to as TRMs), namely the basic building blocks of any AESA;
- an RF Interface designed to split and/or combine the RF signals in transmission and/or reception;
- an RF Manifold, namely an RF network that distributes the RF signals from the Plank assembly to the RF Interface and vice versa; and
- a Motherboard that provides an electrical (power and control) interface between the Plank assembly and the subassemblies, and also works as external logical interface manager of the AESA.

Additionally, FIG. 1b) sketches an example of a traditional Plank assembly architecture in an assembled configuration, to illustrate that the number of components to be mounted causes an overall large thickness of the Plank assembly.

In fact, in order to achieve high performance, an AESA requires hundreds (or even thousands) of TRMs arranged in the Plank assembly and positioned behind the radiating elements of the AESA, each of them including a number of electronic components such as High Power Amplifiers (HPAs), Low Noise Amplifiers (LNAs), T/R limiters, core chips (which, in turn, comprise digitally-controlled phase-shifters and attenuators, drivers/pre-amplifiers, Transmission/Reception (Tx/Rx) switches), controllers, switches and/or circulators for routing RF signals between the transmit and receive paths, and other optional components (filters, pre-amplification stages, etc.). In this connection, FIG. 2 sketches an example of layout of a single traditional TRM, wherein some main electronic components thereof are indicated.

As a consequence of the high number of components and the integration thereof, two main issues are to be taken into account:

1) AESA overall dimensions—in fact, on the one hand, the high number of components to be included in the T/R modules would require a large space envelope, but, on the other hand, the operating frequency also imposes a constraint on the AESA dimensions in terms of distance between adjacent radiating elements; in particular, higher frequencies require tighter lattice spacing between the active elements, which makes increasingly difficult to fit all the electronic components onto a single layer; this becomes even tighter for those applications where $\lambda/2$ spacing (i.e., half wavelength at transmitted frequency) or less is required for a wide scan and for the reduction of undesirable grating lobes; in order to meet both the constraints of hosting all the electronic components of the T/R modules and fitting the lattice spacing, the traditional Plank architecture usually expands along a direction transverse to the radiating elements, thereby increasing the overall AESA thickness;

2) Power Dissipation—in fact, due to the typical low power efficiency of a T/R module and the proximity of the components, an AESA typically needs to dissipate a lot of heat which must be properly extracted to avoid over-temperature condition occurrences and failures; traditional air-cooling systems are not suitable for the high component density of the AESAs and, hence, modern AESAs are liquid-cooled, with consequent increase of power and weight requirements, which, in turn, could limit the installability of AESA systems on airborne platforms.

In this respect, several known solutions related to power dissipation/thermal management in active phased arrays, AESAs, antennas/RF systems and electronic equipment/devices will be presented and briefly discussed hereinafter.

U.S. Pat. No. 8,937,574 B2 concerns a lightweight air-cooled transmit/receive unit and active phased array including the same. In particular, said lightweight air-cooled transmit/receive unit includes a first external cover member, an opposed second external cover member, and a central housing unit, including thermal management means, interposed between the first and second external cover members. A transmit/receive circuit board, including components and an integrated and common radiating element for at least one channel, is interposed between a first surface of the central housing unit and the first external cover member, and a controller circuit board and a power converter circuit board are interposed between an opposed second surface of the central housing unit and the second external cover member.

U.S. Pat. No. 9,172,145 B2 concerns a transmit/receive daughter card with integral circulator. In particular, U.S. Pat. No. 9,172,145 B2 discloses a mixed-signal, multilayer Printed Wiring Board (PWB) fabricated in a single lamination step. The PWB includes one or more RF interconnects between different circuit layers on different circuit boards which make up the PWB. The PWB includes a number of unit cells with radiating elements and an RF cage disposed around each unit cell to isolate the unit cell. A plurality of flip-chip circuits are disposed on an external surface of the PWB and a heat sink can be disposed over the flip-chip components.

U.S. Pat. No. 6,975,267 B2 and U.S. Pat. No. 7,132,990 B2 concern a low profile AESA for Ka-band radar systems. In particular, U.S. Pat. No. 6,975,267 B2 and U.S. Pat. No. 7,132,990 B2 disclose a vertically integrated Ka-band AESA including, among other things, a transitioning RF waveguide relocator panel located behind a radiator faceplate and an array of beam control tiles respectively coupled to one of a plurality of transceiver modules via an RF manifold. Each of the beam control tiles includes a respective plurality of high power T/R cells as well as dielectric waveguides, RF stripline and coaxial transmission line elements. The waveguide relocator panel is preferably fabricated by a diffusion bonded copper laminate stack up with dielectric filling. The beam control tiles are preferably fabricated by the use of multiple layers of low temperature co-fired ceramic (LTCC) material laminated together. The waveguide relocator panel and the beam control tiles are designed to route RF signals to and from a respective transceiver module of four transceiver modules and a quadrature array of antenna radiators matched to free space formed in the faceplate. Planar-type metal spring gaskets are provided between the interfacing layers so as to provide and ensure interconnection between mutually facing waveguide ports and to prevent RF leakage from around the perimeter of the waveguide ports. Cooling of the various components is achieved by a pair of planar forced air heat sink members which are located on either side of the array of beam control tiles. DC power and control of the T/R cells is provided by a printed circuit wiring board assembly located adjacent to the array of beam controlled tiles with solderless DC connections being provided by an arrangement of "fuzz button" electrical connector elements.

U.S. Pat. No. 7,859,835 B2 concerns a method and an apparatus for thermal management of an RF system. In particular, U.S. Pat. No. 7,859,835 B2 discloses a thermal management system that includes an air duct assembly comprising a supply air duct having an air inlet opening, a return air duct having an air exit opening and a plurality of distribution air ducts configured to be in fluid communication with the air inlet opening of the supply air duct and with the air exit opening of the return air duct. A fan is disposed within the air duct assembly to direct air from the air inlet opening of the supply air duct through the supply air duct and out the air exit opening of the return air duct. The fan and supply duct are disposed to direct air over a first surface of a heat sink. A second opposing surface of the heat sink is disposed over and configured to be in thermal contact with a plurality of active circuits disposed on a first surface of an RF multi-layer PWB.

U.S. Pat. No. 8,355,255 B2 concerns cooling of coplanar active circuits. In particular, U.S. Pat. No. 8,355,255 B2 discloses a system that includes a first circuit board provided with integrated circuits, a first thermal spreader coupled to the integrated circuits of the first circuit board, a first compliant board coupled to the first circuit board, a second circuit board provided with integrated circuits and a second thermal spreader coupled to the integrated circuits of the second circuit board. The first circuit board and the first thermal spreader have a first thickness. The second circuit board and the second thermal spreader have a second thickness. The system further includes a second compliant board coupled to the second circuit board, a board assembly coupled to first and second compliant boards and a coldplate assembly in contact with the first and second thermal spreaders. Either of the first or the second compliant boards is configured to expand or contract to account for the differences between the first and second thicknesses.

EP 2 368 291 A1 concerns a cooling architecture, especially for active-module antenna. In particular, EP 2 368 291 A1 relates to air circulation cooling of electronic equipment arranged in superposed rows stacked in racks or in cabinets. More specifically, the solution according to EP 2 368 291 A1 relates to structures of active-module antennas and is intended to supplant conventional ventilation systems that involve the circulation of a stream of air passing in series through the various rows of equipment and carrying away the thermal energy dissipated by this equipment as said stream propagates therethrough. In detail, the solution according to EP 2 368 291 A1 consists in the addition of air cooling means arranged in such a way as to refresh the forced air stream when it leaves one row of equipment and before it reaches the next row.

US 2008/0209931 A1 concerns a cooling system for cooling processing equipment in data centers. Said cooling system includes a vertical conduit carrying a cooling liquid and an array of elongate heat conducting elements, such as heat pipes, extending laterally outwardly from the conduit. An inner end portion of each heat conducting element is in thermal contact with cooling liquid flowing in the conduit and an outer end portion of each heat conducting element is adapted for conductive thermal contact with at least one heat producing electronic component.

WO 2016/065485 A1 relates to a heat removal system or apparatus providing a method of mounting and electrically connecting heat dissipating electrical devices, preferably in a radial geometry while achieving good surface-to-surface clamping force, in liquid- and or air-cooled variants.

US 2017/0323843 A1 concerns a gas-cooled three-dimensional (3D) Integrated Circuit (IC) with wireless interconnects, wherein said 3D IC includes two or more stacks of one or more active layers, a gas-cooling layer separating the two or more stacks and a wireless interconnect between the two or more stacks enabling communication between the two or more stacks.

WO 2014/206578 A2 relates to a housing, a cooling body and a method for producing a cooling body for cooling electric and/or electronic components. In particular, the convection-cooled housing according to WO 2014/206578 A2 comprises a plurality of openings on the upper side of the housing, and a cooling body which comprises at least one lamella, arranged in such a manner, on the upper side of the housing, with respect to the plurality of openings such that an air flow passing through the housing is directed directly to the lamella which is arranged above.

U.S. Pat. No. 7,289,327 B2 concerns active cooling methods and apparatus for modules. In particular, U.S. Pat. No. 7,289,327 B2 discloses a circuit module that includes a system for reducing thermal variation and cooling the circuit module. Said circuit module includes a thermally-conductive rigid substrate having first and second lateral sides, an edge, and an integrated cooling component. The integrated cooling component reduces thermal variation and cools the circuit module. Flex circuitry populated with a plurality of ICs and exhibiting a connective facility that comprises plural contacts for use with an edge connector is wrapped about the edge of the thermally-conductive substrate. Heat from the plurality of ICs is thermally-conducted by the thermally-conductive substrate to the integrated cooling component.

U.S. Pat. No. 9,161,478 B2 concerns an apparatus and a method for an active antenna heat sink. In particular, U.S. Pat. No. 9,161,478 B2 teaches that heat dissipation in vertically arrayed host device configurations can be improved through inclusion of heat sinks having split-stream fin architectures. The split-stream fin architecture includes two or more sets of angled fins separated by a central conduit, which allows for more efficient inflow and/or expulsion of convection cooling air over the heat sink. The split-stream fin arrangement may include inwardly angled fins in order to draw convection cooling air inwards from horizontal inlets, in which case warm exhaust is expelled through the central conduit. Conversely, the split-stream fin arrangement may include outwardly angled fins, which draw convection cooling air from the central conduit, and expel warm air through horizontal exhausts. The split-stream fin arrangements function well when host devices are configured horizontally, which allows for more flexible host device configurations.

Finally, US 2009/231197 A1 discloses a digital beamforming antenna and a related datalink array, wherein the latter includes transmit array elements and receive array elements. Each of the array elements includes a processor. Modulation and demodulation functions are performed at the processors of each array element. The modulation and demodulation functions utilize receive time offsets and phase shifts, and transmit time offsets and phase shifts, respectively. The receive time offsets and phase shifts, and the transmit time offsets and phase shifts are determined by a central processing unit in order to beamform received signals and transmitted signals, respectively. The array elements are arranged in a daisy chain fashion in order to facilitate communication of control parameters, communication of bits to be transmitted and distributed combining of demodulated baseband samples from one array element to another and communicating the combined samples to the central processing unit.

OBJECT AND SUMMARY OF THE INVENTION

In view of the foregoing, the Applicant has felt the need to carry out an in-depth study in order to develop an innovative architecture for AESA systems (in particular, for planar or quasi-planar AESAs), focusing on power efficiency improvement, power requirement reduction, thermal management based on air-cooling, AESA thickness and weight reduction to increase installation feasibility, ease of testing and calibration, AESA control simplification, and architecture modularity and flexibility, thereby arriving at the present invention.

Thence, object of the present invention is that of providing a low-cost architectural solution for planar or quasi-planar AESA systems, which provides high performance as traditional planar or quasi-planar AESA solutions and which, in addition, enables also:
  power efficiency improvement and power requirement reduction;
  thermal management based on air-cooling;
  AESA thickness and weight reduction for increasing installation feasibility;
  ease of testing and calibration;
  AESA control simplification; and
  architecture modularity and flexibility.

This and other objects are achieved by the present invention in that it relates to an Active Electronically Steerable Antenna (AESA), as defined in the appended claims.

In particular, the AESA according to the present invention includes a planar or quasi-planar radiating array configured to transmit and/or receive radiofrequency or microwave signals, and a plurality of three-dimensional U-shaped modules, each arranged behind, and coupled to, a respective planar or quasi-planar radiating subarray of N radiating elements arranged in two rows or columns, each of N/2 radiating elements, N being an even integer.

Each three-dimensional U-shaped module comprises:
  a respective base wall;
  two respective side walls that are
    orthogonally arranged with respect to the respective base wall so as to form therewith a respective three-dimensional U-shaped structure, and
    arranged, each, behind a respective row or column of N/2 radiating elements of the respective planar or quasi-planar radiating subarray; and
  respective transmit and/or receive electronics distributed on said respective base and side walls and configured to implement N respective transmit and/or receive modules;

Moreover, for each three-dimensional U-shaped module, the respective transmit and/or receive electronics includes:
  for each respective side wall, N/2 respective transmission and/or reception front-end modules that are
    mounted on said respective side wall,
    coupled to the N/2 radiating elements of the respective row or column of the respective planar or quasi-planar radiating subarray, and
    configured to implement power amplifiers, low noise amplifiers, and switches or circulators; and
  respective base wall electronics mounted on the respective base wall, connected to the N respective transmission and/or reception front-end modules and configured to carry out beam steering functions including signal phase-shifting, and attenuation and/or amplification functions.

BRIEF DESCRIPTION OF THE DRAWINGS

For a better understanding of the present invention, preferred embodiments, which are intended purely by way of non-limiting examples, will now be described with reference to the attached drawings (all not to scale), wherein.

DETAILED DESCRIPTION OF PREFERRED EMBODIMENTS OF THE INVENTION

The following description is presented to enable a person skilled in the art to make and use the invention. Various modifications to the embodiments will be readily apparent to those skilled in the art, without departing from the scope of the present invention as claimed. Thence, the present invention is not intended to be limited to the embodiments shown and described, but is to be accorded the widest scope of protection consistent with the features defined in the appended claims.

The present invention concerns an innovative architecture for Transmit and/or Receive (T/R) modules of planar or quasi-planar AESAs (conveniently, of planar/quasi-planar fully-populated AESAs), which allows achieving, among other thing, a reduction in overall AESA dimensions and an optimization of cooling requirement.

In particular, said innovative architecture is based on a three-dimensional (3D) U-shaped module structure including a base wall and two side walls, preferably a base Printed Circuit Board (PCB) and two side PCBs, wherein:

all electronic components of a plurality of T/R modules are distributed on said base and side walls (preferably, on said base and side PCBs); and said three walls (preferably, said three PCBs) are conveniently enclosed and mounted in metallic structures designed to facilitate heat exchange and cooling.

An overall planar or quasi-planar AESA can, thence, be achieved by grouping a suitable number of 3D U-shaped modules, arranged side by side, according to required AESA characteristics in terms of shape and number of radiating elements.

In other words, the innovative architecture according to the present invention is based on a 3D distribution of required electronic components (i.e., of T/R modules and, conveniently, also other electronics) for implementing Transmission and/or Reception (Tx/Rx) front-end, amplification and beam steering functions of an AESA, wherein 3D U-shaped modules are used as basic building blocks to make a planar or quasi-planar AESA.

The present invention has been conceived to mitigate some of the main issues affecting traditional AESA technology when high performance is required, namely:

use of liquid-cooling, high power supply and high weight; and high thickness and strong impact on aircraft shape and installation.

In fact, as previously explained, for some applications, these issues related to traditional AESA technology may represent a strong limitation in terms of installation feasibility.

On the contrary, the innovative 3D distribution of the T/R modules' components according to the present invention (according to which all solid state electronic components are conveniently mounted on PCBs arranged so as to form a U-shaped structure) enables an affordable implementation of the front-end, amplification and beam steering tasks of a planar or quasi-planar AESA, with smaller thickness, lower costs and weight, and relaxed cooling requirements.

Figure 3:
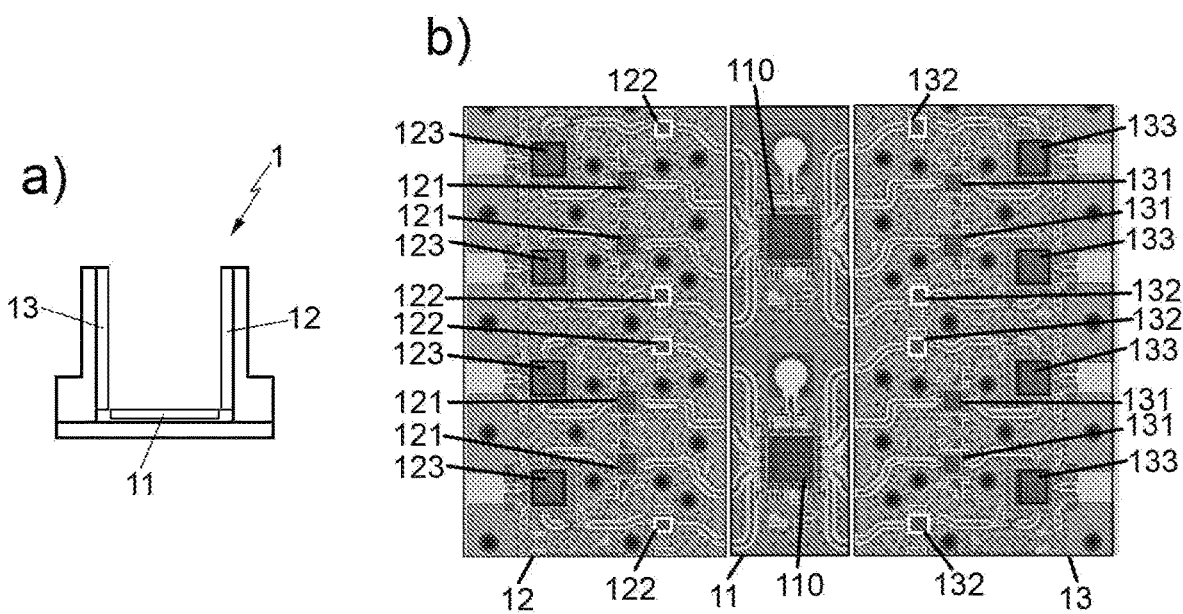
FIGS. 3a) and 3b) sketch a first 3D U-shaped module according to an exemplary embodiment of the present invention.

For a better understanding of the present invention, FIGS. 3a) and 3b) sketch a first 3D U-shaped module (denoted as a whole by 1) according to an exemplary embodiment of the present invention.

In particular, the first 3D U-shaped module 1 is elongated in a longitudinal direction that is orthogonal to parallel planes on which its U-shape is defined/lies.

More specifically, FIG. 3a) is a schematic cross-sectional view of said first 3D U-shaped module 1 on a plane on which its U-shape is defined/lies (i.e., orthogonally to its longitudinal dimension), wherein said first 3D U-shaped module 1:
  includes
    a base PCB 11 and
    two side PCBs 12, 13 orthogonally arranged with respect to the base PCB 11 so as to form therewith a 3D U-shaped structure elongated in said longitudinal direction; and
  is designed to implement eight T/R modules whose electronic components are distributed among the base and side PCBs 11, 12, 13.

Additionally, FIG. 3b) sketches an example of distribution of the electronic components of the eight T/R modules of the first 3D U-shaped module 1 on said base and side PCBs 11, 12, 13. In particular, two core chips 110 are installed/mounted on the base PCB 11 and connected to Transmission and/or Reception (Tx/Rx) front-end electronics installed/mounted on the side PCBs 12, 13 to drive said Tx/Rx front-end electronics. More specifically, said two core chips 110 are conveniently configured to carry out signal phase-shifting, attenuation and/or amplification, switching and splitting and/or combination, while the Tx/Rx front-end electronics is conveniently configured to perform power amplification in transmission (Tx), low noise amplification in reception (Rx) and Tx/Rx switching. In detail, the Tx/Rx front-end electronics includes, for each of the two side PCBs 12, 13, four respective Power Amplifiers (PAs) 121, 131, four respective Low Noise Amplifiers (LNAs) 122, 132, and four respective Tx/Rx switches or circulators 123, 133, whereby each of the two side PCBs 12, 13 is designed to be coupled to, and to drive, four respective RF transmitting and receiving elements (i.e., radiating elements) of the AESA. Preferably, the two side PCBs 12, 13 are spaced apart by a distance of about $\lambda/2$, where $\lambda$ denotes the operating wavelength.

Figure 4:
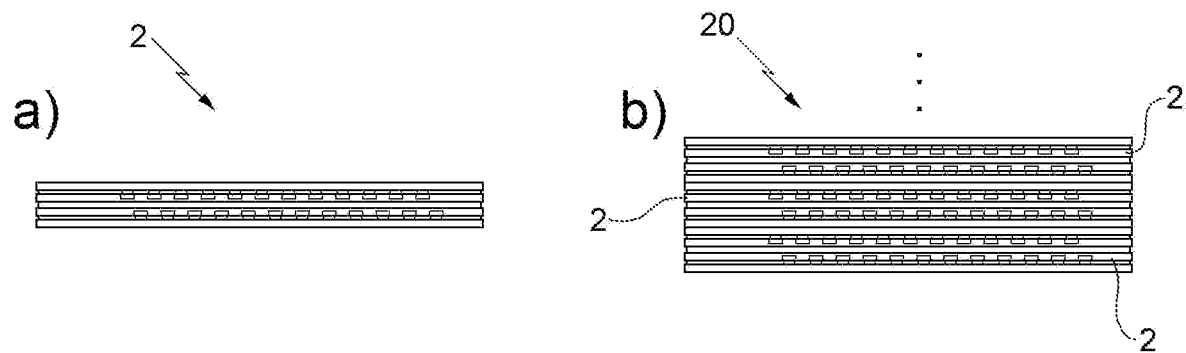
FIGS. 4a) and 4b) respectively sketch a second 3D U-shaped module and a corresponding AESA based thereon, according to an exemplary embodiment of the present invention.

In order to make an overall AESA, number and size of the employed 3D U-shaped modules depend on the required dimension of said overall AESA, i.e. on the required number of T/R modules. In fact, each 3D U-shaped module includes a number N of the total number of TRMs in the AESA. Due to the U-shaped layout, the Tx/Rx front-end of the N TRMs are divided between the two side walls of the 3D U-shaped module. When oriented along a horizontal direction, the 3D U-shaped module can be seen as a small AESA including two rows and N/2 columns, wherein N can be the number of the required TRMs of the AESA, or a submultiple thereof. Thence, the total AESA dimensions can be achieved by grouping a suitable number of the same basic 3D U-shape modules arranged side by side in the vertical direction. In this respect, FIG. 4a) sketches a second 3D U-shaped module 2 according to an exemplary embodiment of the present invention, wherein said second 3D U-shaped module 2 implements 24 TRMs arranged in 2 rows and 12 columns. Additionally, FIG. 4b) sketches an example of AESA (denoted as a whole by 20) including three or more second 3D U-shaped modules 2 (for a total of 72 or more TRMs) arranged side by side in the vertical direction.

Figure 5:
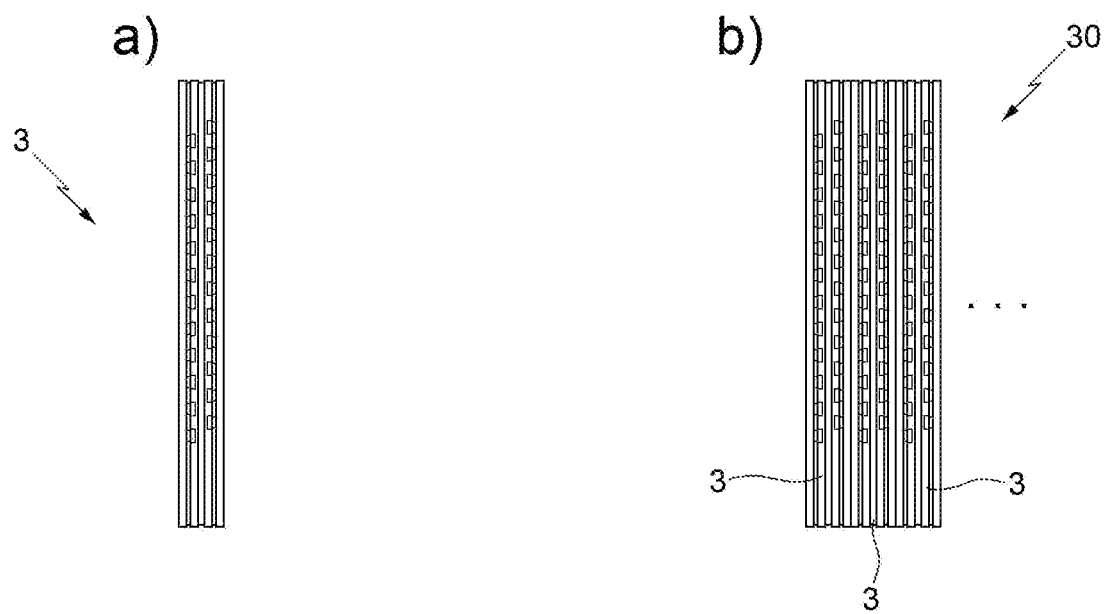
FIGS. 5a) and 5b) respectively sketch a third 3D U-shaped module and a corresponding AESA based thereon, according to an exemplary embodiment of the present invention.

Similarly, a 3D U-shaped module can be seen as a small AESA of N/2 rows and two columns and, hence, according to the need, an AESA can be achieved by grouping a suitable number of the same basic 3D U-shape modules arranged side by side in the horizontal direction. In this respect, FIG. 5a) sketches a third 3D U-shaped module 3 according to an exemplary embodiment of the present invention, wherein said third 3D U-shaped module 3 implements 24 TRMs arranged in 12 rows and 2 columns. Additionally, FIG. 5b) sketches an example of AESA (denoted as a whole by 30) including three or more third 3D U-shaped modules 3 (for a total of 72 or more TRMs) arranged side by side in the horizontal direction.

Figure 6:
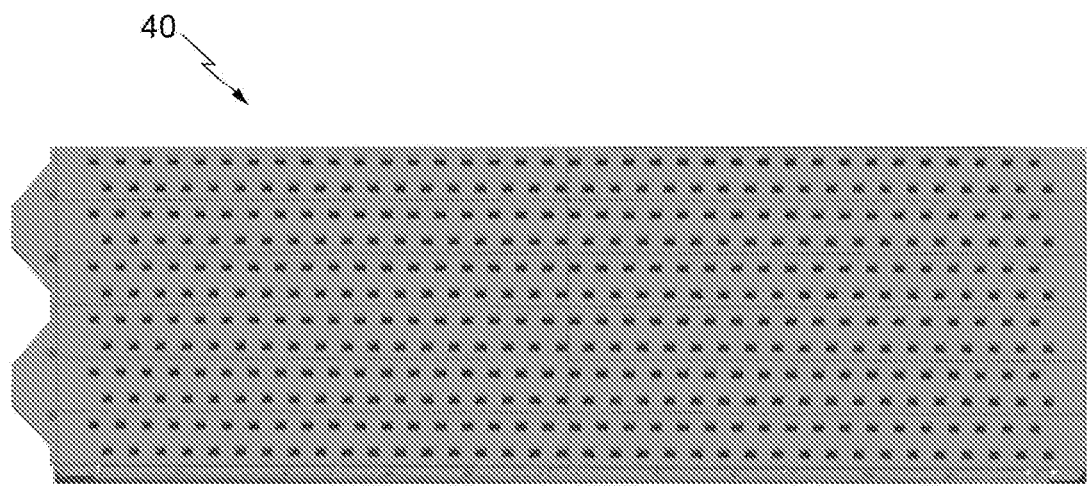
FIG. 6 shows a further example of AESA according to an exemplary embodiment of the present invention.

Obviously, an AESA can be also achieved by conveniently grouping a suitable number of the same basic 3D U-shape modules arranged side by side along both the vertical and horizontal directions. In this respect, FIG. 6 shows a further example of AESA (denoted as a whole by 40) including a plurality of same basic 3D U-shaped modules arranged side by side along both the vertical and horizontal directions, according to an exemplary embodiment of the present invention.

The use of basic 3D U-shaped modules to form an AESA brings significant benefits in terms of simplification of design, manufacturing, testing and validation, as well as it contributes to an overall development and production cost reduction.

Therefore, as previously explained, the present invention concerns an innovative 3D architecture for grouping and distribution of TRMs' components to be used in compact, air-cooled AESA antennas in order to fit all the solid state components in a lattice of a fully-populated AESA, by mounting the components (preferably, packaged COTS—i.e., Commercial Off-The-Shelf or Commercially available Off-The-Shelf—components) on three different PCBs and arranging them in a U-shaped structure—as, for example, schematically illustrated in FIGS. 3a) and 3b).

Conveniently, the three independent PCBs are interconnected in the front area, and supported by a specific metallic structure which ensures an efficient air flow through the T/R modules, to facilitate heat exchange and cooling. A fin profile can be also conveniently used to improve cooling efficiency.

Figure 7A:
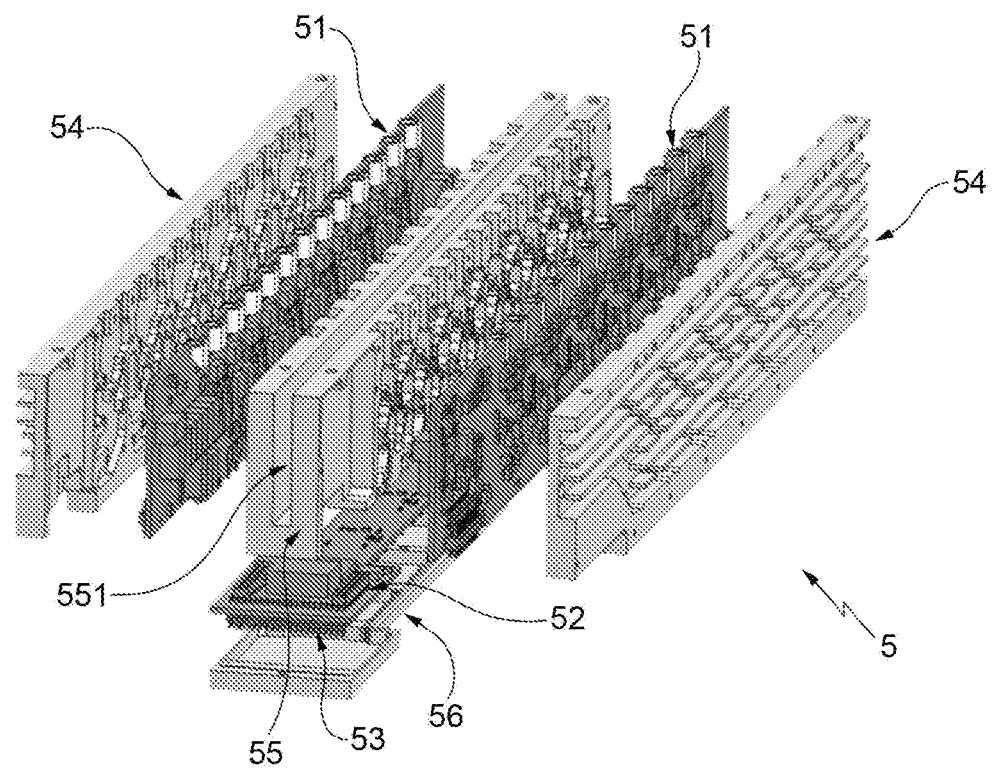
FIGS. 7a and 7b respectively illustrate a 3D U-shaped module architecture in an exploded configuration and in an assembled configuration, according to an exemplary embodiment of the present invention, while FIGS. 7c and 7d respectively show top and bottom views thereof.

FIG. 7a depicts a more detailed 3D U-shaped module architecture in an exploded configuration, according to an exemplary embodiment of the present invention.

In particular, FIG. 7a shows a fourth 3D U-shaped module 5 that is elongated in a longitudinal direction that is orthogonal to parallel planes on which its U-shape is defined/lies, and that includes:

two longitudinally-elongated side PCBs 51 fitted with Tx/Rx front-end electronics (e.g., PAs, LNAs, and circulators or switches) to carry out Tx/Rx front-end functions;

a longitudinally-elongated base PCB fitted with
core chips configured to carry out signal phase-shifting, attenuation and/or amplification, switching and splitting and/or combination, and
a PCB controller 52 connected via a connector 53 to an AESA main controller (not shown in FIG. 7a), for a distributed control of the TRMs and an overall simplification of the AESA main controller interfaces (conveniently, a plurality of PCB controllers could be also used for each U-shaped module, depending on the size);

two longitudinally-elongated, side mechanical supports 54 (preferably, two metallic, side mechanical supports 54) arranged/mounted externally to the side PCBs 51 and fitted, preferably, with heat sinks;

a longitudinally-elongated, U-shaped, central mechanical support 55 (preferably, a metallic, U-shaped, central mechanical support 55) that is arranged/mounted on/over the base PCB between the side PCBs 51 and is fitted with a longitudinally-elongated air passage (or channel) 551 for air transit and, hence, for air-cooling of the base PCB and its electronics, and of the side PCBs 51 and its Tx/Rx front-end electronics; and a longitudinally-elongated, bottom mechanical support 56 (preferably, a metallic, bottom mechanical support 56) on which the base PCB is arranged/mounted.

Figure 7B:
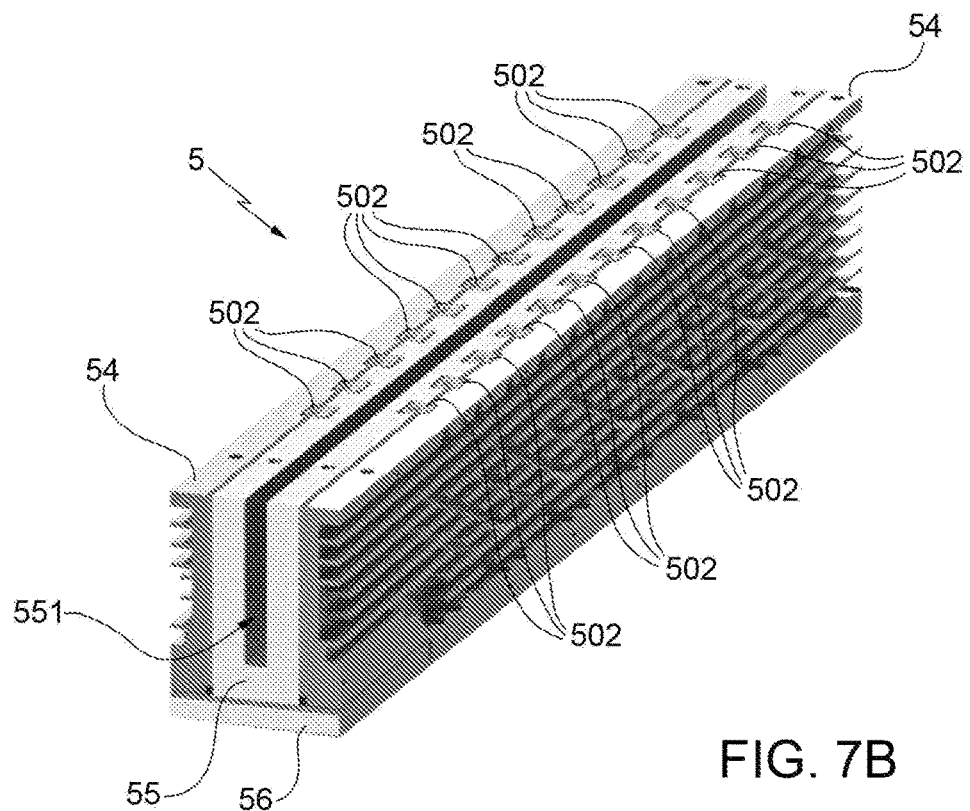

FIG. 7b depicts the assembled configuration of the fourth 3D U-shaped module 5, wherein the base PCB is mounted on the bottom mechanical support 56, the U-shaped central mechanical support 55 is mounted on/over the base PCB and interposed between the side PCBs 51 (in particular, between top/front surfaces thereof which the Tx/Rx front-end electronics is installed/mounted on), and the two side mechanical supports 54 are mounted externally to the side PCBs 51 (in particular, each on a bottom/back surface of a respective side PCB 51), whereby the 3D U-shaped structure formed by the base PCB and the side PCBs 51 is enclosed in a 3D U-shaped metallic structure formed by the bottom mechanical support 56 and the side mechanical supports 54.

Figure 7C:
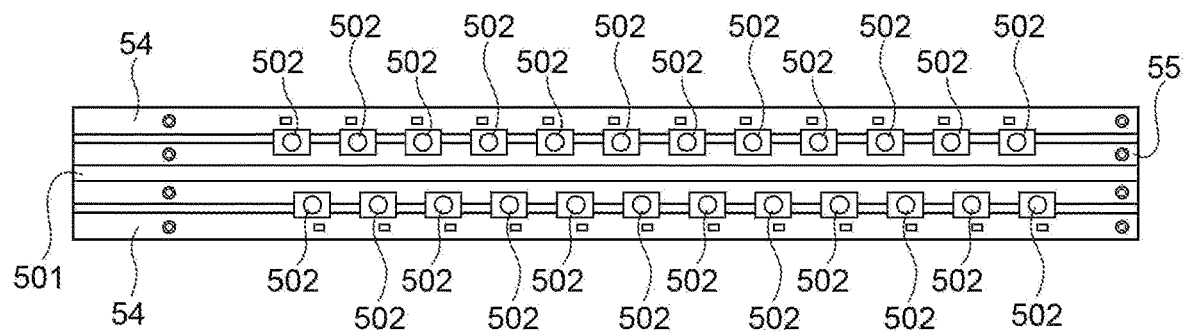
Figure 7D:
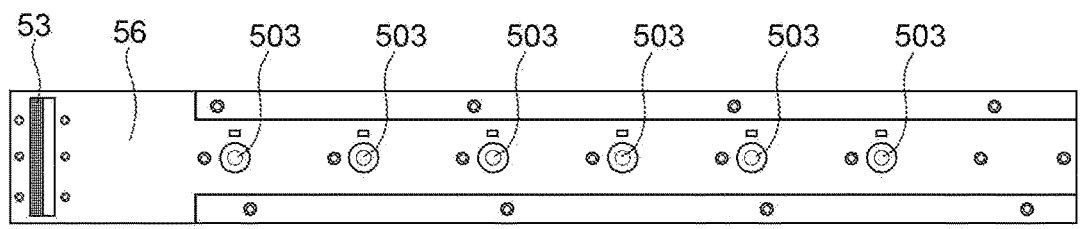

Additionally, FIGS. 7c and 7d respectively show a top view and a bottom view of the fourth 3D U-shaped module 5, wherein:

as shown in FIG. 7c, the air passage 551 is closed on the top by a longitudinally-elongated metallic element 501;

twenty-four radiating elements 502 are shown in FIG. 7c (and also in FIG. 7b), which are connected to the Tx/Rx front-end electronics on the side PCBs 51; and six input/output splitting/combination ports 503 are shown in FIG. 7d, which are connected to the core chips of the base PCB, preferably to six corresponding core chips, each designed to drive four respective radiating elements 502.

Figure 8A:
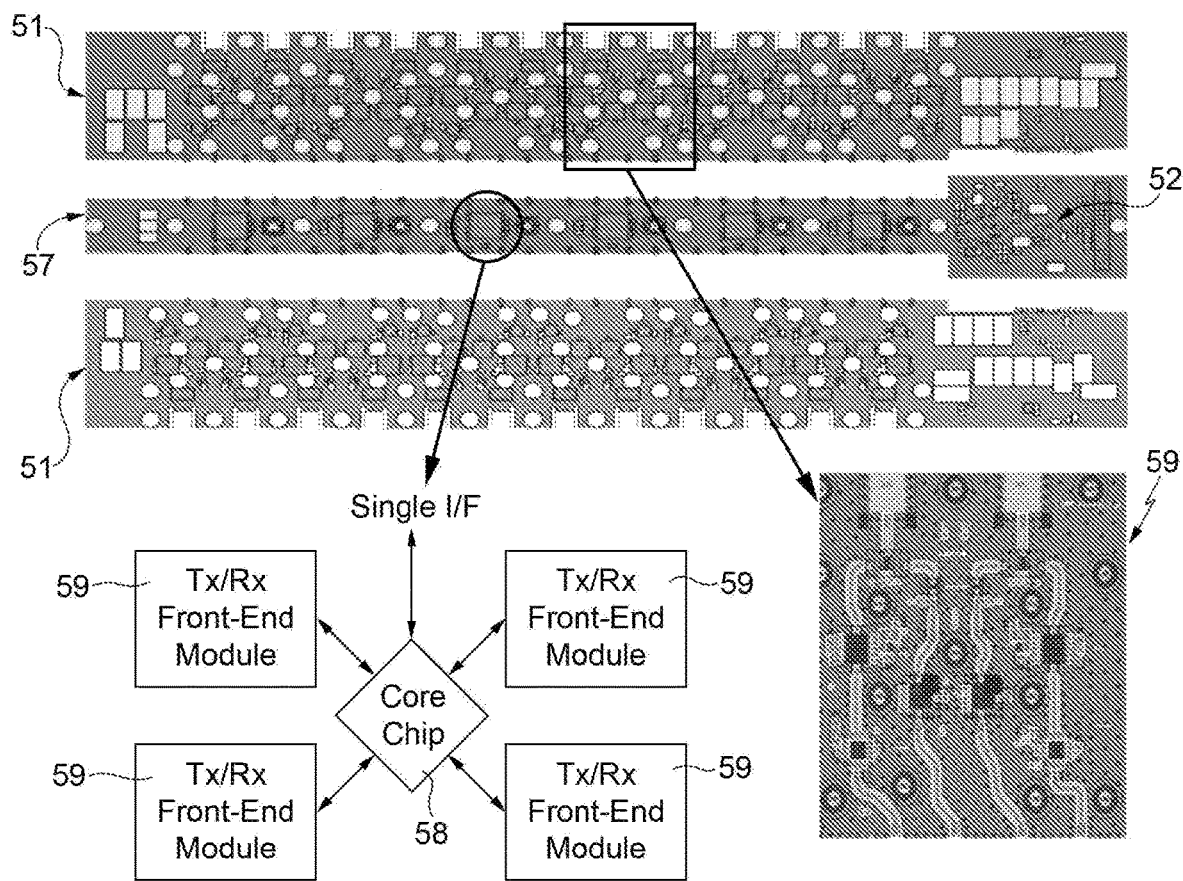
FIGS. 8a and 8b sketch an example of implementation of electronic components in the 3D U-shaped module architecture of FIGS. 7a, 7b, 7c and 7d.

In this connection, FIG. 8a depicts an example of implementation of the electronic components installed/mounted on the two side PCBs 51 and on the base PCB of the fourth 3D U-shaped module 5, wherein:

the Tx/Rx front-end electronics (including PAs, LNAs, and circulators or switches) on the side PCBs 51 is implemented by means of discrete components; and the core chips on the base PCB (in FIG. 8a denoted as a whole by 57) are implemented by means of highly integrated quad-core chips (or ICs), each of which is configured to control four radiating elements 502 and to implement phase-shifting, signal attenuation and/or pre-amplification, Tx/Rx switching, one-to-four signal distribution (during Tx phase) and four-to-one beam-forming (during RX phase).

Figure 8B:
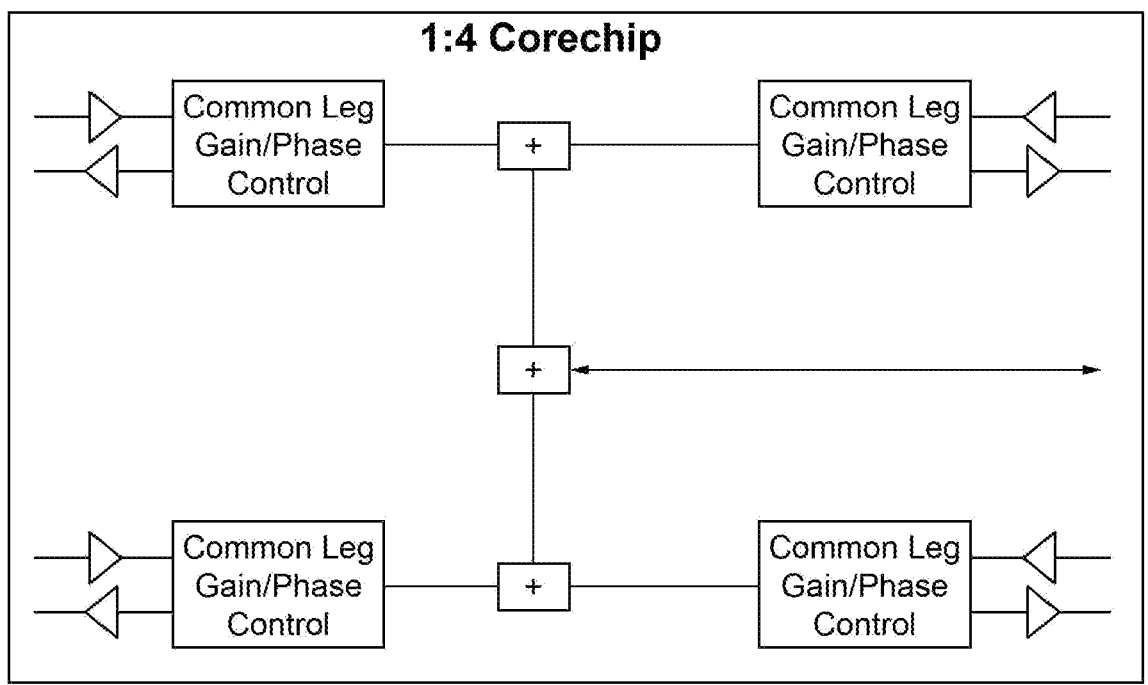

Additionally:

one of the quad-core chips (denoted by 58) installed/mounted on the base PCB 57 is also schematically illustrated at the bottom left of FIG. 8a, wherein said quad-core IC 58 is provided with a single interface (I/F) and controls four respective Tx/Rx front-end modules 59 (each including a respective PA, a respective LNA and a respective switch/circulator implemented by means of discrete components) installed/mounted on the side PCBs 51;

a principle layout of the quad-core chips 58 is also sketched in FIG. 8b; and a zoomed image of the Tx/Rx front-end electronics (i.e., of the Tx/Rx front-end modules 59) installed/mounted on one of the side PCBs 51 is also provided at the bottom right of FIG. 8a.

With reference to the electronics implementation architecture depicted in FIGS. 8a and 8b and previously described, it is worth noting that:

each Tx/Rx front-end module 59 can be individually controlled by the respective quad-core chip 58;

nowadays quad-core packaged ICs are largely available on the market and can be a very suitable solution for the present invention; and packaged components allow easy installation and testing on the PCBs.

As an alternative to the use of chips, also base PCB electronics could be conveniently implemented by means of discrete components, thereby resulting in a larger width of the base PCB (approximately comparable to the width of the PCB controller 52) which, however, still ensures λ/2 spacing between the side PCBs.

Additionally, as an alternative to the implementation of the Tx/Rx front-end electronics by means of discrete components, integrated Tx/Rx front-end modules can be conveniently used, combining multiple functions into a single package, in order to reduce costs and design complexity, further shrink PCB footprints and minimize thickness. In this connection, FIG. 9 schematically illustrates an example of integrated Tx/Rx front-end module layout advantageously exploitable for implementing the Tx/Rx front-end electronics of a 3D U-shaped module.

Figure 9:
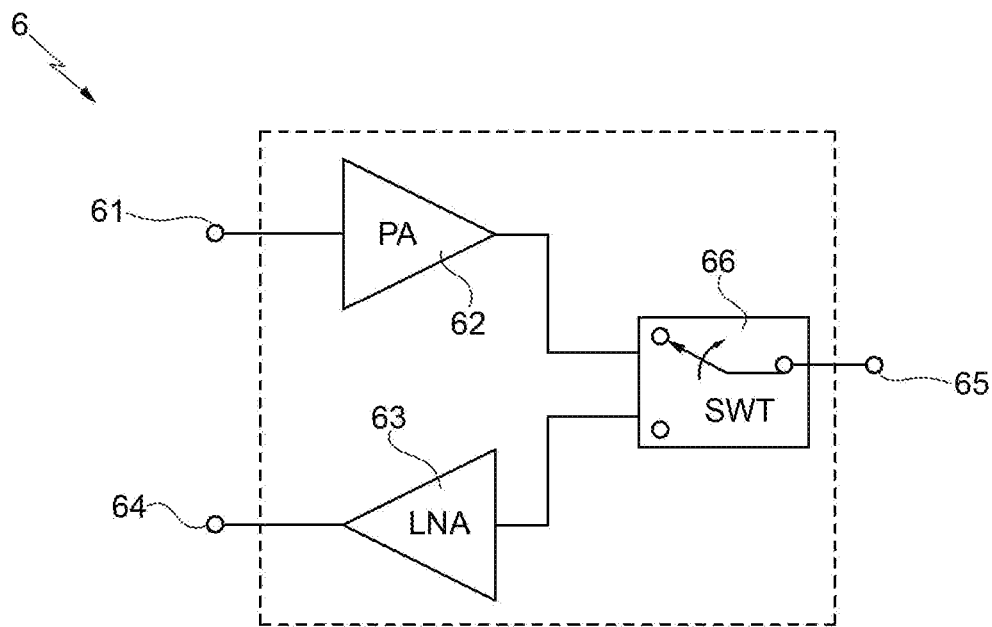
FIG. 9 schematically illustrates an example of integrated Tx/Rx front-end module layout advantageously exploitable for implementing Tx/Rx front-end electronics of a 3D U-shaped module according to an exemplary embodiment of the present invention.

In particular, FIG. 9 sketches an integrated Tx/Rx front-end module (denoted as a whole by 6) that includes:

a first port 61 designed to act as Tx input, namely to receive, from base PCB electronics (not shown in FIG. 9), RF signals to be transmitted;

a PA 62 connected to the first port 61 and configured to apply power amplification to the RF signals to be transmitted;

an LNA 63 configured to apply low noise amplification to incoming RF signals;

a second port 64 connected to the LNA 63 and designed to act as Rx output, namely to provide the base PCT electronics with the incoming RF signals amplified by the LNA 63;

a third port 65 designed to provide a radiating element (not shown in FIG. 9) with the RF signals to be transmitted amplified by the PA 62, and receive, from the radiating element, the incoming RF signals received by the latter; and a switch 66 operable to selectively connect the third port 65 to the PA 62 or the LNA 63.

Thanks to the use of integrated Tx/Rx front-end modules, the height of the side walls (i.e., the side PCBs) can be reduced, thereby achieving a corresponding thickness reduction for the 3D U-shaped modules.

Figure 10:
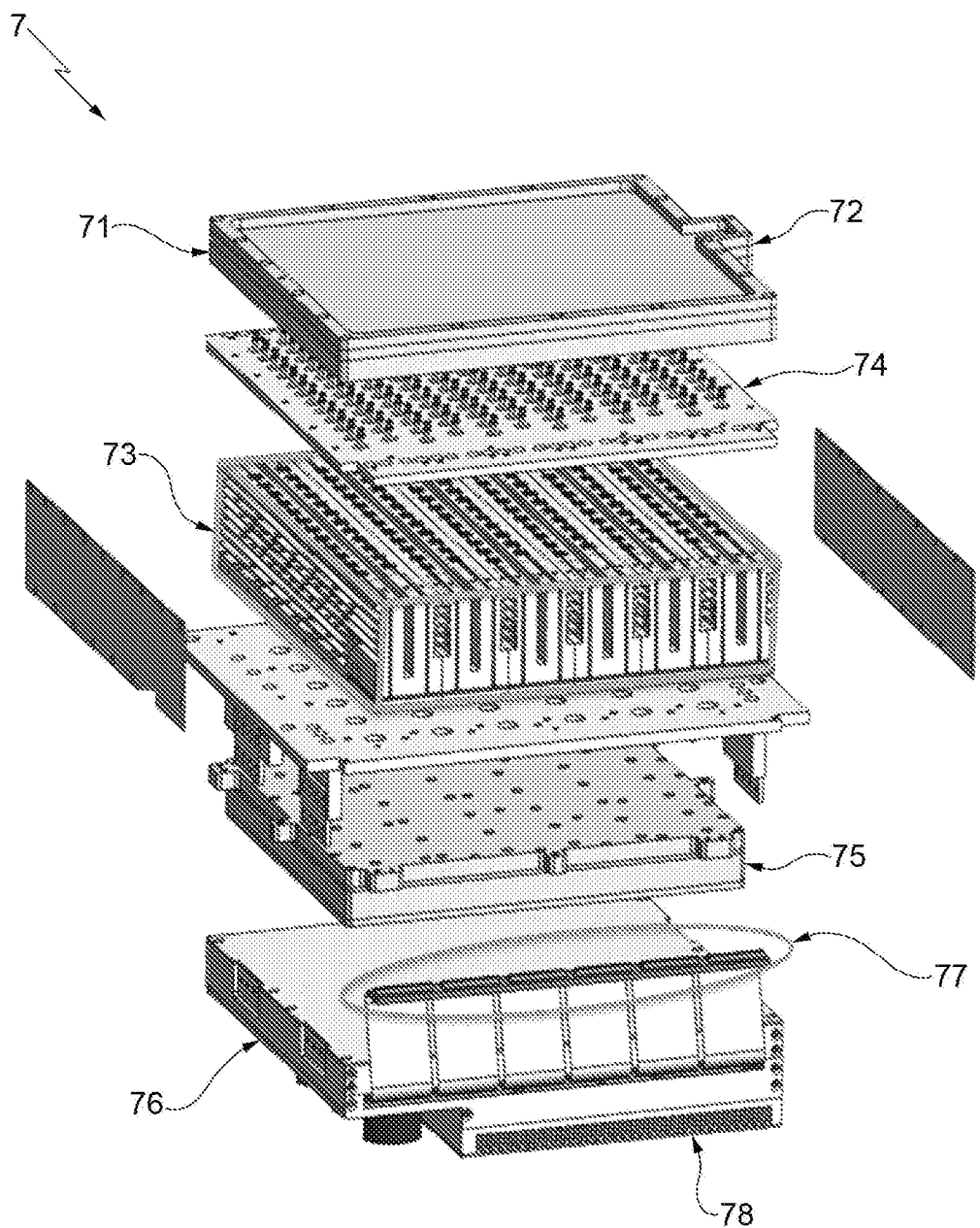
FIG. 10 depicts an example of AESA architecture using 3D U-shaped modules according to an exemplary embodiment of the present invention.

FIG. 10 depicts an example of AESA architecture using 3D U-shaped modules according to an exemplary embodiment of the present invention. In particular, FIG. 10 is an exploded view of an AESA (denoted as a whole by 7) that includes:

a radiating plate 71 that is configured to perform RF radiation and echo reception functions and that is coupled with a guard antenna 72;

an assembly of 3D U-shaped T/R modules 73 coupled with the radiating plate 71 through an interface of RF connectors 74;

an RF combiner/divider board 75 coupled with the 3D U-shaped T/R modules 73 and configured to split RF signals to be transmitted to feed said 3D U-shaped T/R modules 73 in transmission, and combine RF signals coming from said 3D U-shaped T/R modules 73 in reception; and an AESA main controller and a DC-DC board (denoted as a whole by 76) coupled with a T/R controller and modules connectors (denoted as a whole by 77) and with a heat sink 78.

The AESA architecture shown in FIG. 10 represents an affordable and scalable solution for planar AESAs.

Use of the 3D U-shaped module architecture according to the present invention provides many benefits (in particular, in terms of extremely efficient air-cooling, AESA thickness reduction, loss reduction to the radiating elements, ease of testing, AESA control simplification, architecture flexibility and possibility of multipolarimetric operations), as it will be explained in detail hereinafter.

In particular, the 3D U-shaped module architecture according to the present invention facilitates heat exchange and supports efficient air-cooling, with the air flowing through the 3D U-shaped module and, in case of multiple 3D U-shaped modules combined together to form an AESA, also in the region between two adjacent 3D U-shaped modules with fin profiles. In this way, all the PCBs are cooled on both sides, and no liquid is necessary.

Figure 11:
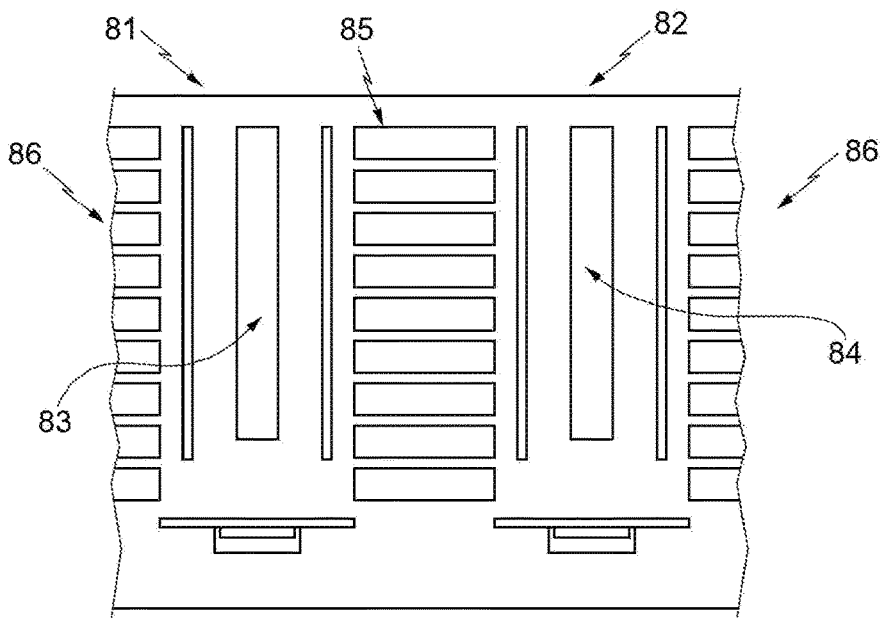
FIG. 11 shows an example of two 3D U-shaped modules arranged side by side according to an exemplary embodiment of the present invention.

In this connection, FIG. 11 depicts an example of two 3D U-shaped modules (in particular, a first 3D U-shaped module denoted as a whole by 81 and a second 3D U-shaped module denoted as a whole by 82) arranged side by side, wherein:

- a first air passage 83 (in the form of a rectangular channel) is located between the side PCBs and over the base PCB of the first 3D U-shaped module 81;
- a second air passage 84 (in the form of a rectangular channel) is located between the side PCBs and over the base PCB of the second 3D U-shaped module 82;
- first fins (denoted as a whole by 85) are arranged between the adjacent side PCBs of the first and second 3D U-shaped module 81, 82, while second fins (denoted as a whole by 86) are arranged externally to the other side PCBs of the first and second 3D U-shaped module 81, 82.

In this way, air can flow through the first air passage 83, the second air passage 84 and the first and second fins 85, 86, whereby the side PCBs are cooled on both sides.

Efficient air-cooling also enables the use of high-power amplifiers (e.g., the use of power amplifiers of up to 20 W output power each has been demonstrated to be feasible, in contrast to traditional fully planar arrays) and increases antenna performance keeping the antenna size small.

In order to demonstrate merits of the present invention in terms of air-cooling efficiency, the results of different thermal analyses performed by the Applicant for different antenna sizes and different power management requirements will be reported hereinafter.

Figure 12:
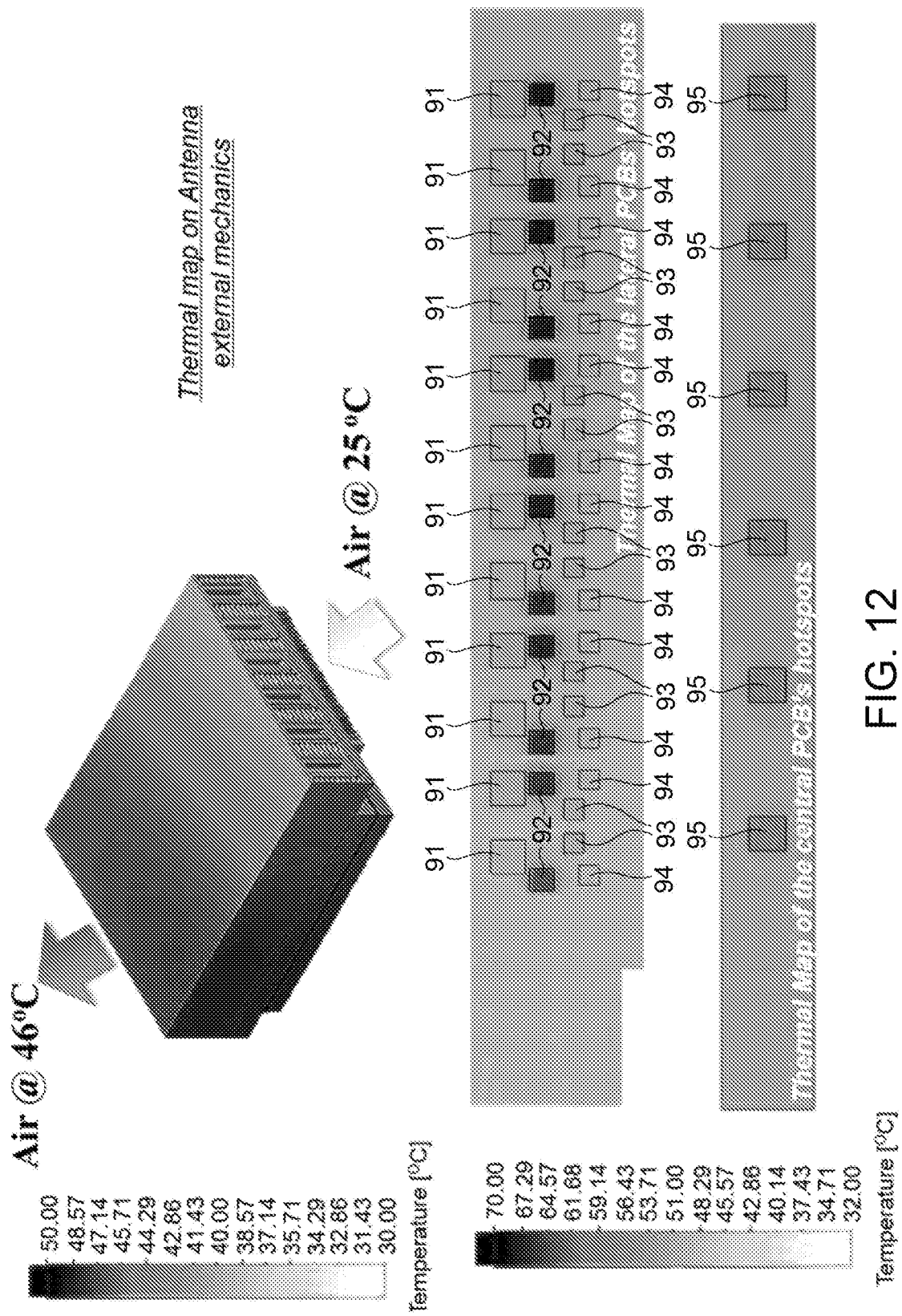
FIGS. 12, 13a) and 13b) show results of a first thermal analysis conducted on a planar AESA antenna including 3D U-shaped modules.
Figure 13:
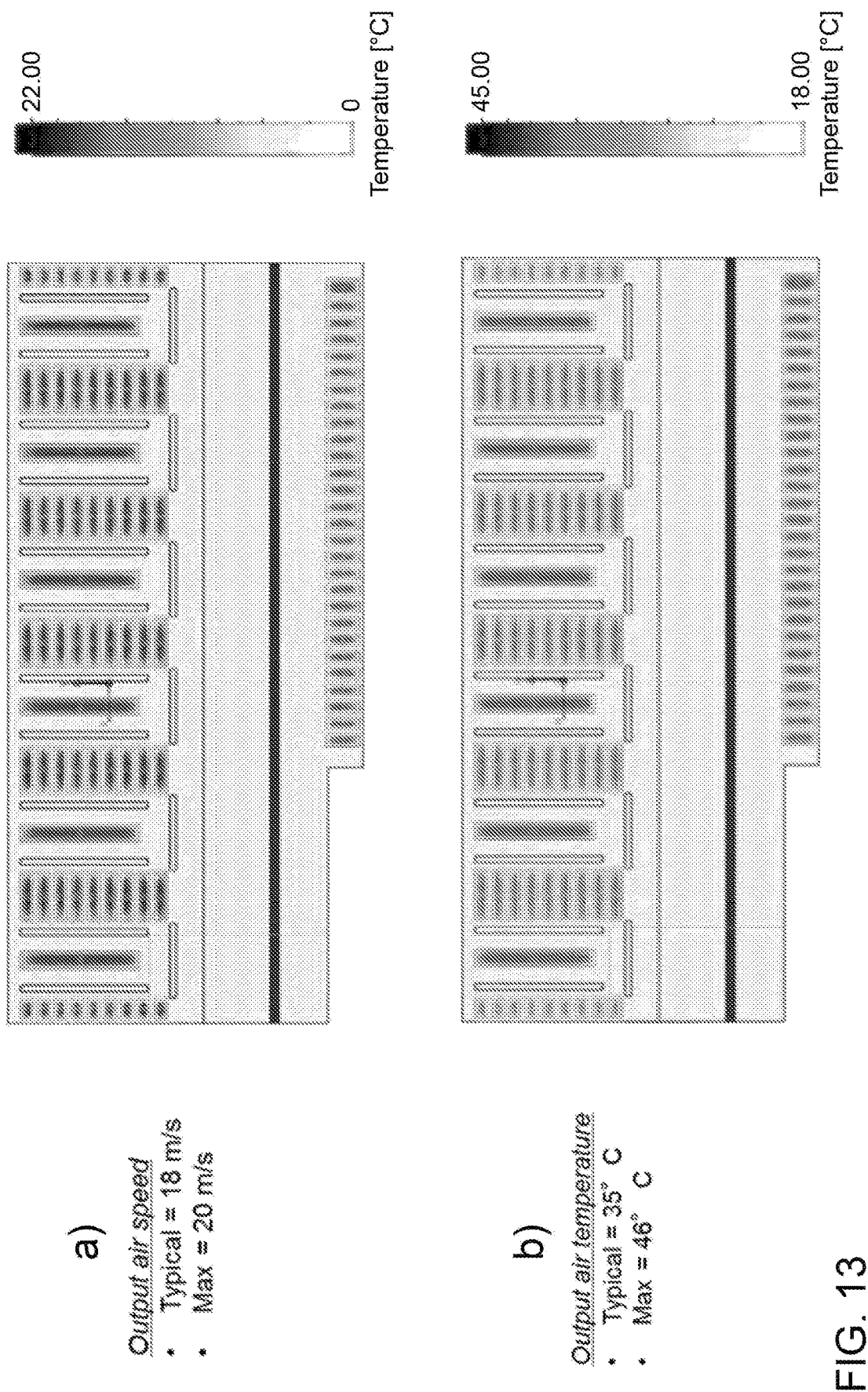

In particular, FIGS. 12, 13*a*) and 13*b*) show results of a first thermal analysis conducted on a planar AESA antenna including 3D U-shaped modules implementing 144 TRMs and fitted with 10 W peak power amplifiers. Said first thermal analysis was carried out under the following conditions:

Total volume flow rate=55 L/s;
Input air temperature=25° C.;
Relative pressure=250 Pa;
Tx/Rx Duty Cycle (DC)=10%;
Transmitted Power=144 W at 10% DC (1440 W peak);
Power dissipation=529 W at 10% DC;
Power absorption=673 W at 10% DC.

More specifically, FIG. 12 shows:
at the top, a thermal map of antenna external mechanics; and,
at the bottom, thermal maps of PCBs' hotspots.

For a better understanding of FIG. 12, in the bottom thermal map of side (or lateral) PCBs' hotspots, reference numeral 91 denotes the switches/circulators, reference numeral 92 denotes the 10 W peak power amplifiers, reference numeral 93 denotes the LNAs and reference numeral 94 denotes preamplifiers; additionally, in the bottom thermal map of base (or central) PCB's hotspots, reference numeral 95 denotes the core chips.

As far as the thermal map of the side (or lateral) PCBs' hotspots is concerned, it is worth noting that the highest temperatures are reached by the 10 W peak power amplifiers 92, while the temperatures reached by the other components (i.e., the switches/circulators 91, the LNAs 93 and the preamplifiers 94) are noticeably lower.

Instead, as far as the thermal map of the base (or central) PCB's hotspots is concerned, it is worth noting that all the core chips 95 operates substantially at one and the same temperatures. This feature represents an important technical advantage of the present invention. In fact, as previously explained, the core chips on the base PCB performs, among various functions, also signal phase-shifting. As is known, phase-shifters are highly sensitive to temperature and, hence, traditional AESA antenna design typically has to take account of, and to compensate for, phase-shifts due to different operating temperatures of the phase-shifters. On the contrary, the present invention allows the core chips (and, hence, the phase-shifters) to operate at one and the same temperature, whereby it is no longer necessary to take account of phase-shift compensations related to different operating temperatures of the phase-shifters.

As for FIGS. 13*a*) and 13*b*), the former shows output air speed, while the latter shows output air temperature.

Figure 14:
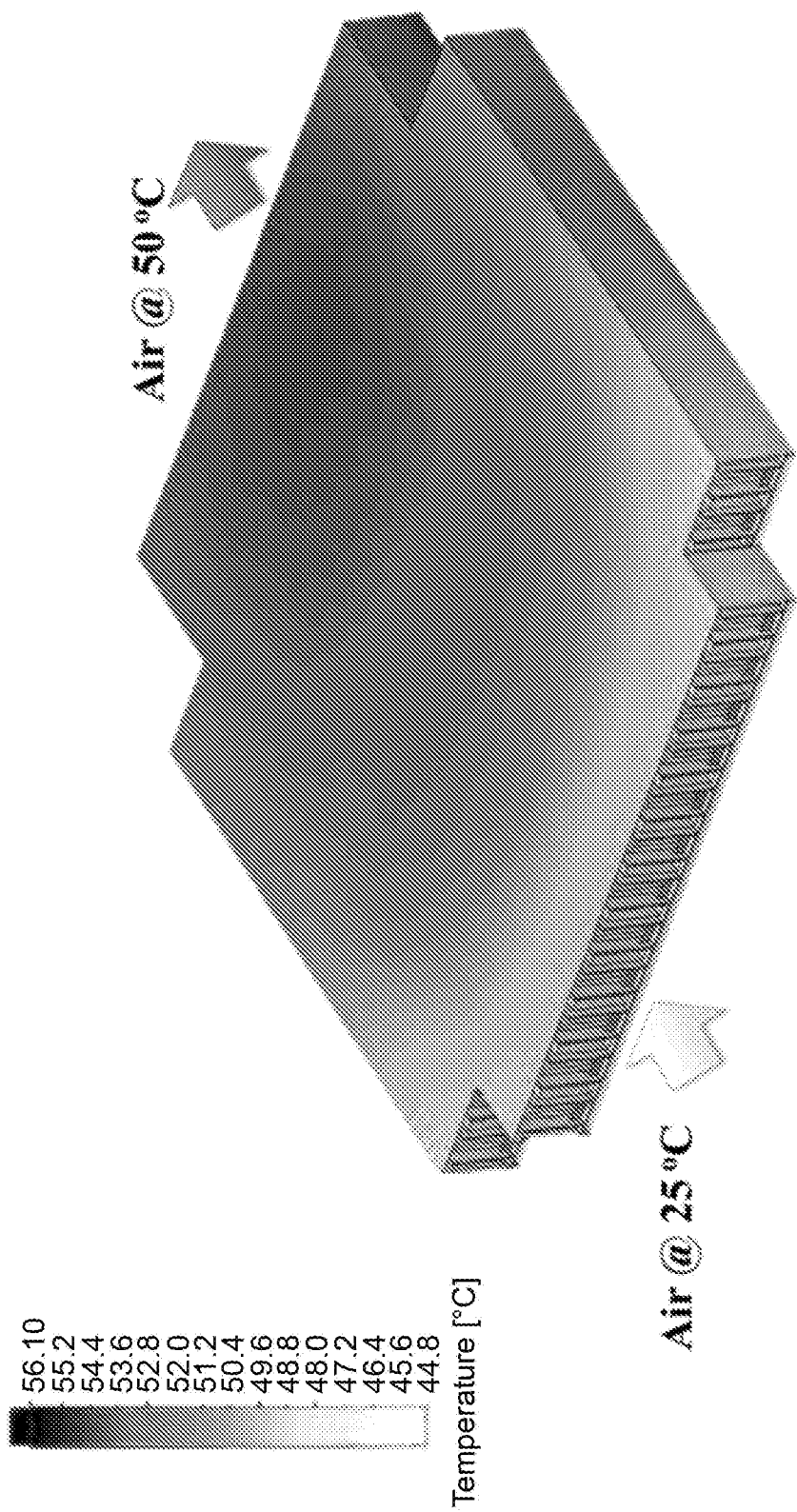
FIG. 14 shows results of a second thermal analysis conducted on a planar AESA antenna including 3D U-shaped modules.

Additionally, FIG. 14 shows results of a second thermal analysis conducted on a planar AESA antenna including 3D U-shaped modules implementing 704 TRMs and fitted with 4.5 W nominal peak power amplifiers. Said second thermal analysis was carried out under the following conditions:

Total volume flow rate=68 L/s;
Input air temperature=25° C.;
Tx/Rx Duty Cycle (DC)=10%;
Net Radiated Power=260 W at 10% DC (2600 W net peak considering 0.85 dB loss after nominal Tx peak power of 3168 W);
Power absorption=1340 W at 10% DC.

In particular, FIG. 14 shows a thermal map of antenna external mechanics.

Figure 15:
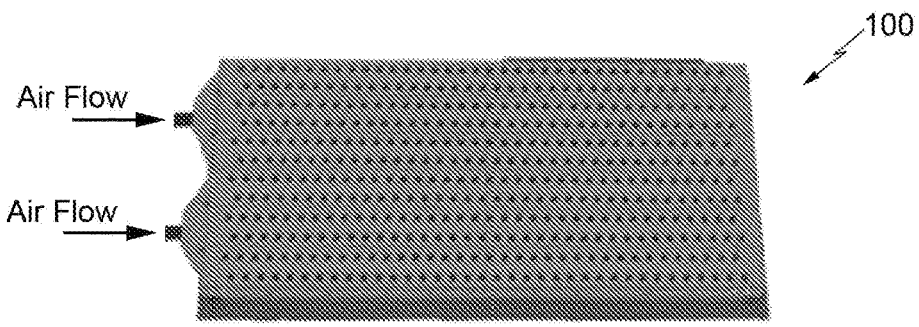
FIGS. 15 and 16 sketch two alternative ways of forcing air to flow through an AESA including 3D U-shaped modules.
Figure 16:
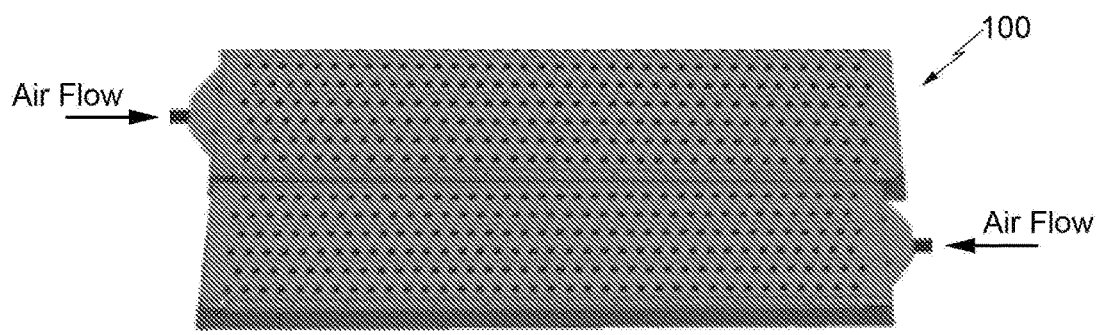

Air can be forced to flow in one and the same direction through any 3D U-shaped module as in the examples reported in FIGS. 12, 13*a*), 13*b*) and 14, or in alternating directions, one forward and one backward, between two adjacent sections, as convenient. In this connection, it is worth noting that this second way of forcing the air to flow through the 3D U-shaped modules (i.e., in alternating directions) may be preferable when the AESA includes a large number of 3D U-shaped modules lined up along a particular dimension (e.g., large antennas for surveillance missions), as reported in the example shown in FIGS. 15 and 16, wherein, in an exemplary large AESA antenna 100 including 3D U-shaped modules, air can be forced to flow through the 3D U-shaped modules by plenums either from one and the same side (FIG. 15), or from opposite sides (FIG. 16).

Figure 17:
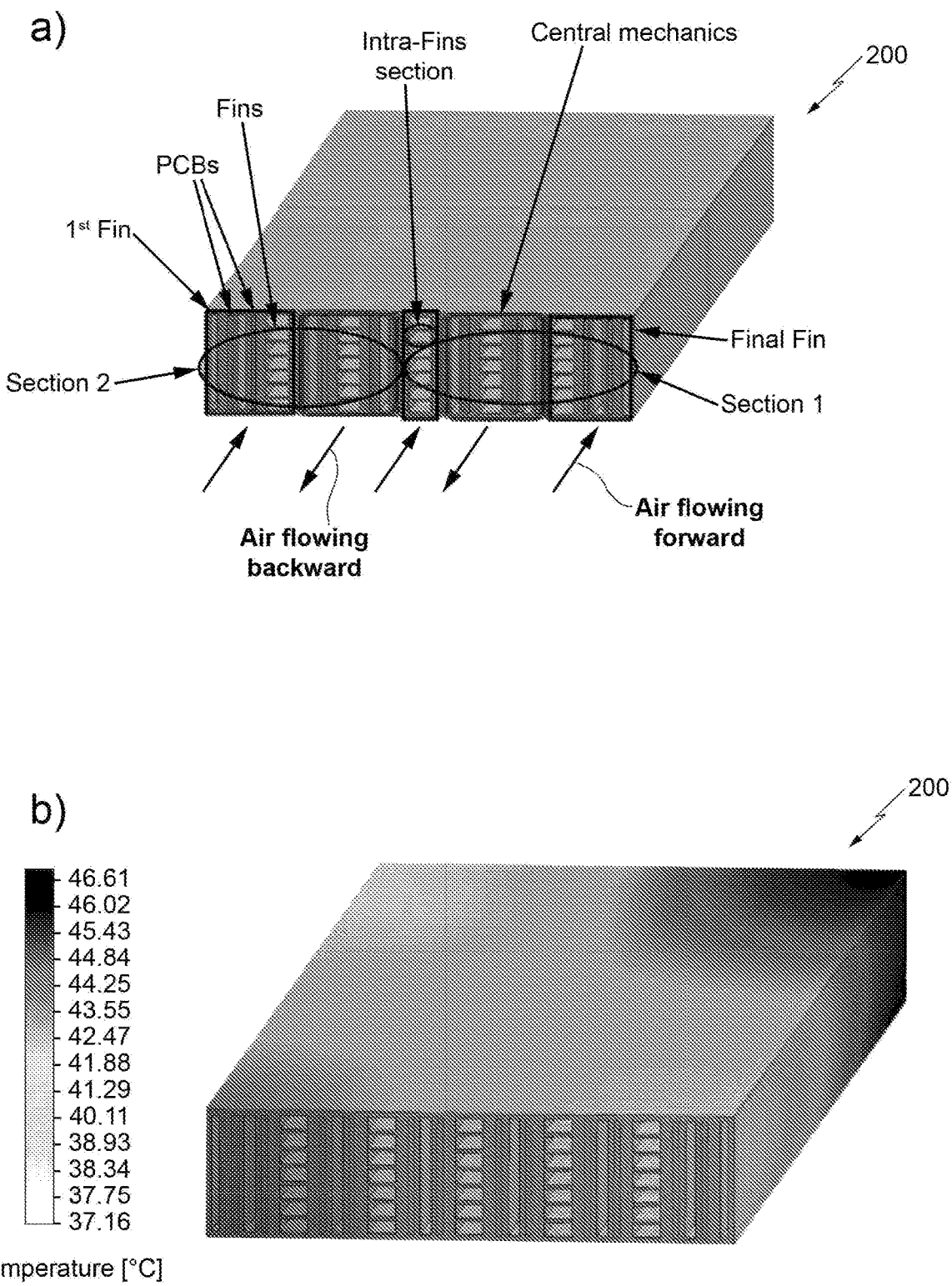
FIGS. 17a) and 17b) shows results of a third thermal analysis conducted on a planar AESA antenna including 3D U-shaped modules.

Additionally, FIGS. 17*a*) and 17*b*) show results of a third thermal analysis conducted on a planar AESA antenna including 3D U-shaped modules implementing 432 TRMs, fitted with 7 W peak power amplifiers and operating at a Duty Cycle (DC) of 10%, with air forced to flow in opposite directions through the 3D U-shaped modules. In particular, FIG. 17*a*) sketches air-cooling layout of said planar AESA antenna (denoted as a whole by 200), while FIG. 17*b*) shows a corresponding thermal map of antenna external mechanics.

Thanks to the use of the present invention, the dimension of AESA antennas remarkably reduces, increasing installation feasibility on a large number of airborne platforms, including Unmanned Aerial Vehicles (UAVs).

Figure 1:
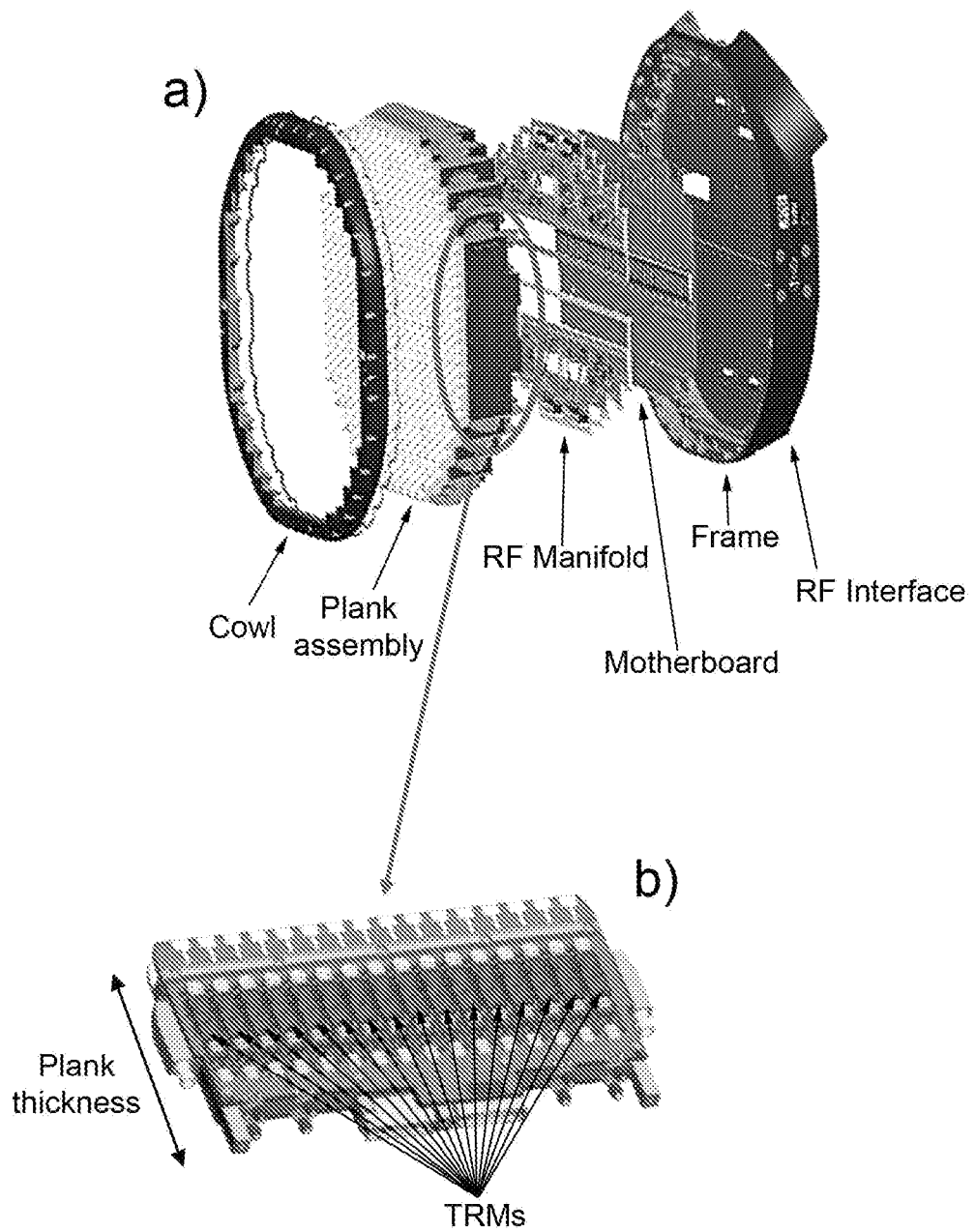
FIGS. 1a) and 1b) respectively sketch a traditional AESA architecture in an exploded configuration, and a traditional Plank assembly architecture in an assembled configuration.
Figure 2:
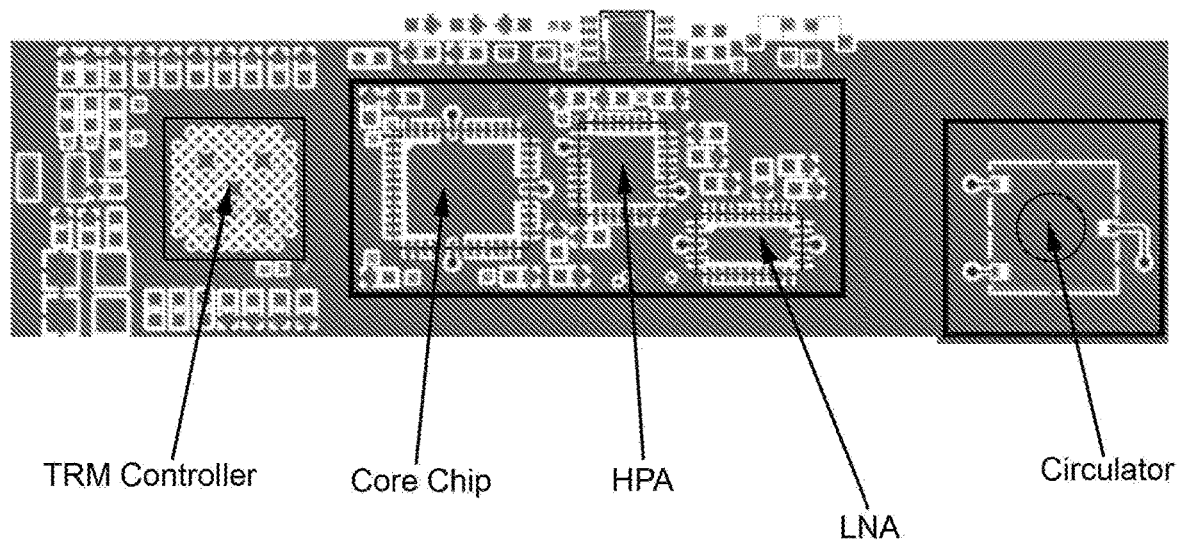
FIG. 2 sketches a traditional T/R module layout.

In fact, the 3D U-shaped module architecture according to the present invention allows to fit all the electronic components of a T/R module in the array lattice spacing, positioning each TRM just behind the relevant radiating element, and limiting the need for expansion along the transverse direction, as typically occurs in the case of traditional Plank architecture—in this respect, reference can be made, for example, to FIGS. 1*a*) and 1*b*).

For example, for X-band operation, the thickness of a 3D U-shaped module can be as small as 2.5 cm (or lower), with a weight less than 0.5 kg. The thickness is mainly related to value of the Power Amplifier (PA) peak power and the need for cooling. Scalable dimensions can be conveniently achieved for operation in different frequency bands.

Moreover, as additional advantage of the present invention, it is worth noting that, since the High Power Amplifier (HPA) (that generates the RF signal to be transmitted) and the Low Noise Amplifier (LNA) (that determines receive sensitivity) of the T/R modules are very close to the radiating element, the losses in both transmission and reception paths are reduced.

Furthermore, each 3D U-shaped module can be conveniently equipped with power and control connectors that can be advantageously exploited for automatic testing and calibration by connecting TRM connectors to proper RF measurements equipment, thereby achieving a noticeable ease of testing and calibration.

Additionally, a dedicated controller is preferably mounted on each 3D U-shaped module, allocating part of the TRMs programming and control to the 3D U-shaped module itself, through dedicated Field Programmable Gate Array (FPGA) that interfaces the AESA main controller. In this way, a distributed control of the overall AESA functioning is implemented, simplifying the tasks of the AESA main controller.

The modular architecture according to the present invention allows constructing AESA antennas with different shape/size, by properly combining the 3D U-shaped basic building blocks. This enables reusability of the same (or few) modules to form bigger antennas or differently shaped antennas, depending on the application, the performance requirements and/or installation constraints. For example, for UAV applications, where payload weight and power consumption are severe limiting factors, a small, yet performing, rectangular antenna including a limited number of radiating elements can be the most suitable solution, while fighter applications better use circular antennas to have symmetry in both azimuth and elevation directions and to fit within the nose of the aircraft; where the application asks for better performance, a large antenna can be achieved by grouping a suitable number of the basic 3D U-shape modules arranged side by side in the longitudinal direction.

Figure 18:
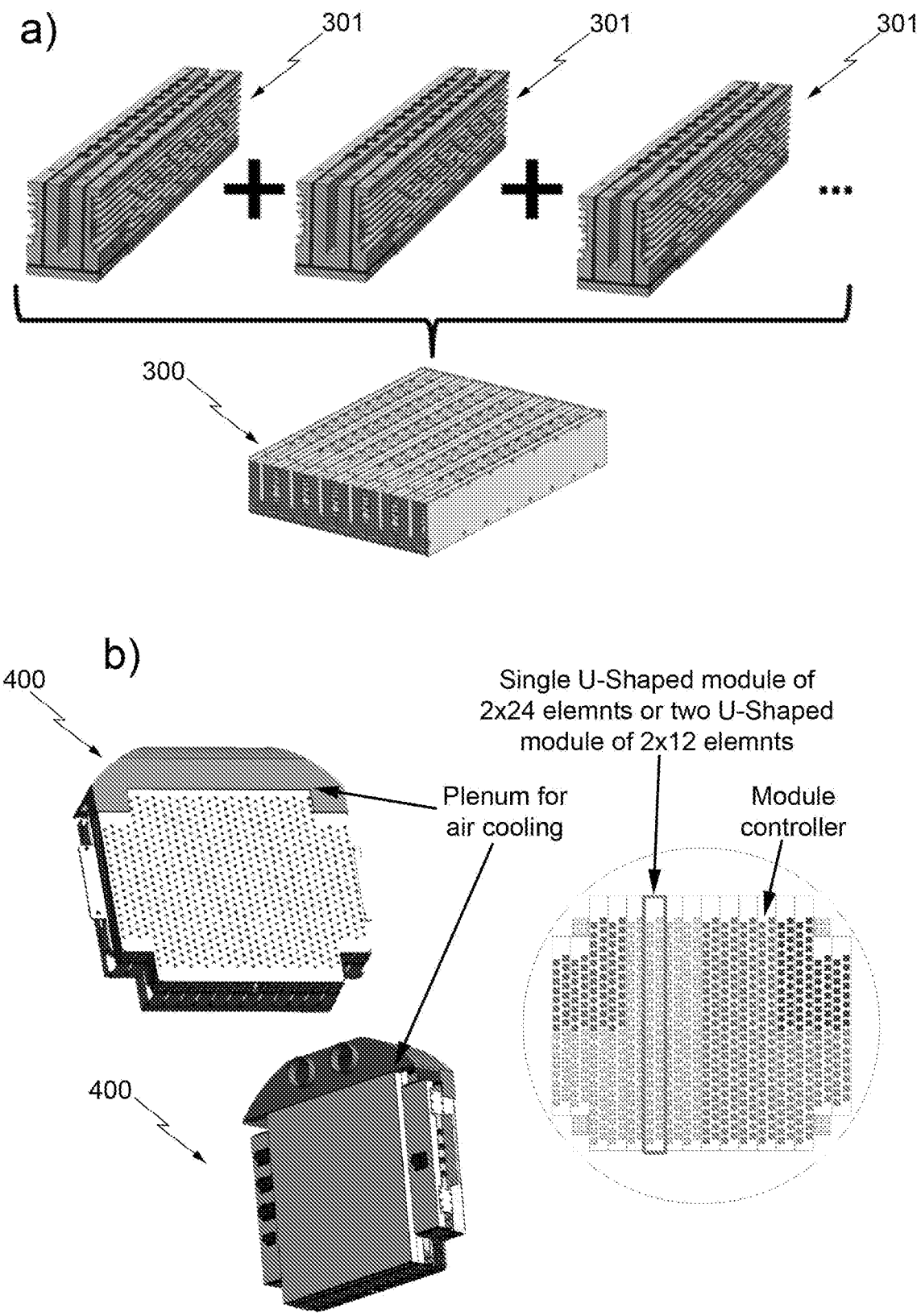
FIGS. 18a) and 18b) sketch examples of possible combinations of 3D U-shaped modules to obtain antennas with different shape/size.

In this connection, FIGS. 18a) and 18b) sketch two examples of possible combinations of 3D U-shaped modules to obtain antennas with different shape/size. In particular, FIG. 18a) shows a small rectangular AESA antenna 300 including six 3D U-shaped modules 301; FIG. 18b) shows a circular AESA antenna 400 obtained combining 3D U-shaped modules of different sizes, for fighter applications. The AESA vertical dimension can be achieved by using either a single 3D U-shaped module with, for example, 2×24 elements, or two 3D U-shaped modules with 2×12 elements each (with one or two T/R controllers), lined up in the vertical direction.

Beside the flexibility benefit, the modular architecture according to the present invention also simplifies system integration, enabling rapid repair and reducing costs.

Additionally, it is worth also noting that the U-shape and the application of highly integrated components (i.e., integrated Tx/Rx front-end modules, quad-core ICs, etc.) allows space-saving, yet guaranteeing the overall AESA compactness. As a consequence, it is possible to support multipolarimetric operations by adding (in the "saved" space) switches to feed two different radiating elements with different polarizations.

In view of the foregoing, technical advantages and innovative features of the present invention are immediately clear to those skilled in the art.

In particular, it is important to stress the point that the present invention concerns an innovative 3D U-shaped architecture for T/R modules of AESA antennas (in particular, planar or quasi-planar AESAs) which allows to fit all the electronic components performing amplification, Tx/Rx front-end and beam steering tasks in the space of the grid of a fully-populated AESA (conveniently, with elements spacing of about half the operating wavelength).

The arrangement of the solid state components on three different PCBs to form a 3D U-shape structure results in achieving an equivalent AESA technology, but in a low-thickness, low-cost, low-volume, high-cooling-efficiency, high-performance and easy to test and to calibrate configuration.

In particular, the 3D U-shaped module architecture according to the present invention allows reducing AESA costs, size and cooling requirements, yet guaranteeing high performance as traditional planar or quasi-planar AESA architectures.

More specifically, the use of the 3D U-shaped modules according to the present invention to form AESAs brings several significant benefits including:
efficient air-cooling (even in case of high performance requirements), also enabling the use of high power amplifiers;
compact and cost-effective configuration (conveniently, by the use of COTS components and highly integrated technology);
power efficiency improvement and power requirement reduction;
overall AESA thickness and weight reduction, thereby increasing installation feasibility;
architecture modularity and flexibility;
simplification of design, manufacturing, testing and validation;
easy assembling of packaged components on PCBs;
easy installation, integration, testing, calibration and series production;
AESA control simplification;
development and production cost reduction, in particular development cost reduction for new AESAs by reuse of the 3D U-shaped modules as common blocks in other AESA antennas, with different size and for different applications; and
reduced losses to the radiating elements.

Since the present invention allows designing low-cost, low-volume, low-power-consumption, air-cooled, high-performance AESA systems, said AESA systems can be advantageously installed on board any type of platform, even mid-size or small aircraft, with low impact on the platform for AESA system installation.

It is worth also noting that none of the currently known solutions teaches, suggests or discloses the distinctive 3D U-shaped module architecture according to the present invention, or the above technical advantages thereof.

For example, the solution according to U.S. Pat. No. 8,937,574 B2 uses two parallel PCBs: one comprising TRM electronics (including the core chips), and the other comprising control and power supply components. The PCB comprising the TRM electronics is connected to another parallel structure housing the beamforming network. Since AESA operation imposes a maximum spacing between the radiating elements (i.e., about half the operating wavelength), the solution according to U.S. Pat. No. 8,937,574 B2 forces to perform an electronic and mechanical assembling in very confined spaces that can render such a solution infeasible or extremely critical as the operating frequency increases.

On the contrary, according to the present invention, two parallel PCBs house TRMs' Tx/Rx front-end electronics, while a third orthogonal PCB houses the core chips for signal phase-shifting, attenuation/amplification, switching and splitting/combination, along with module control means. In this way, it is extremely easier to achieve the spacing between the radiating elements imposed by AESA operation.

Additionally, the cooling mechanism according to U.S. Pat. No. 8,937,574 B2 is structurally different than that one according to the present invention. In fact, according to U.S. Pat. No. 8,937,574 B2, the T/R units are cooled by secondary air flows that are generated by a main air flow via a structure fitted with openings and that are orthogonal to said main air flow. This mechanism reduces cooling efficiency and causes also an increase in AESA thickness with respect to the present invention wherein the main air flow directly cools the electronic components with no need for additional structures or secondary air flows.

Instead, the solution according to U.S. Pat. No. 9,172,145 B2 is related to the well-known AESA tile architecture, wherein the basic tile is made by several planar layers that implement the electric, electronic, mechanical and RF functions of an AESA. Thence, differently from the present invention, this architectural solution does not use any 3D distribution of TRM components/functions on a U-shaped structure. Moreover, again differently from the present invention, the cooling mechanism according to U.S. Pat. No. 9,172,145 B2 is implemented by means of a heat sink applied to an external surface of the tile and coupled via a cold plate.

The solution according to U.S. Pat. No. 6,975,267 B2 and U.S. Pat. No. 7,132,990 B2 is quite similar to that one according to U.S. Pat. No. 9,172,145 B2, wherein multiple mutually parallel layers of circuit elements are sandwiched together against an antenna faceplate. Therefore, also in this case, there is no 3D distribution of TRM components/functions on a U-shaped structure. Additionally, according to U.S. Pat. No. 6,975,267 B2 and U.S. Pat. No. 7,132,990 B2, cooling is achieved by means of a pair of planar forced air heat sink members located on either side of the array beam control tiles, whereby such a cooling mechanism is completely different with respect to that one according to the present invention.

Also the solution according to U.S. Pat. No. 8,355,255 B2 is related to that one according to U.S. Pat. No. 9,172,145 B2, thereby resulting in a completely different architectural and cooling solution with respect to the present invention.

Moreover, it is worth noting that also U.S. Pat. No. 7,859,835 B2, EP 2 368 291 A1, US 2008/0209931 A1, WO 2016/065485 A1, US 2017/0323843 A1, WO 2014/206578 A2, U.S. Pat. No. 7,289,327 B2 and U.S. Pat. No. 9,161,478 B2 concern architectural and cooling solutions that are completely different with respect to the present invention.

Finally, it is worth also noting that the antenna architecture according to US 2009/231197 A1 is totally different from the AESA architecture according to the present invention.

In conclusion, it is clear that numerous modifications and variants can be made to the present invention, all falling within the scope of the invention, as defined in the appended claims.

The invention claimed is:

1. An active electronically steerable antenna, comprising:
a planar or quasi-planar radiating array configured to transmit and/or receive radiofrequency or microwave signals; and
a plurality of three-dimensional U-shaped modules, each arranged behind, and coupled to, a respective planar or quasi-planar radiating subarray of N radiating elements arranged in two rows or columns, each of N/2 radiating elements, N being an even integer;
wherein each of the plurality of three-dimensional U-shaped modules comprises:
a respective base wall;
two respective side walls that are,
orthogonally arranged with respect to the respective base wall so as to form therewith a respective three-dimensional U-shaped structure, and
arranged, each, behind a respective row or column of N/2 radiating elements of the respective planar or quasi-planar radiating subarray; and
respective transmit and/or receive electronics distributed on said respective base and side walls and configured to implement A respective transmit and/or receive modules;
wherein, for each of the plurality of three-dimensional U-shaped modules, the respective transmit and/or receive electronics includes:
for each respective side wall, N/2 respective transmission and/or reception front-end modules that are,
mounted on said respective side wall,
coupled to the N/2 radiating elements of the respective row or column of the respective planar or quasi-planar radiating subarray, and
configured to implement power amplifiers, low noise amplifiers, and switches or circulators; and
respective base wall electronics mounted on the respective base wall, connected to the N respective transmission and/or reception front-end modules and configured to carry out beam steering functions including signal phase-shifting, and attenuation and/or amplification functions.

2. The active electronically steerable antenna of claim 1, wherein the respective base wall electronics of each of the plurality of three-dimensional U-shaped modules is configured to carry out also switching, and signal splitting and/or combination functions.

3. The active electronically steerable antenna according to claim 1, wherein the respective base wall electronics of each of the plurality of three-dimensional U-shaped modules includes control electronics that is configured to control operation of said three-dimensional U-shaped module and is designed to be coupled to a main controller of the active electronically steerable antenna.

4. The active electronically steerable antenna according to claim 1, wherein the respective transmission and/or reception front-end modules of each of the plurality of three-dimensional U-shaped modules are configured, each, to implement a respective power amplifier, a respective low noise amplifier and a respective switch or circulator.

5. The active electronically steerable antenna according to claim 1, wherein the respective base wall electronics of each of the plurality of three-dimensional U-shaped modules is implemented by a plurality of packaged integrated circuits or core chips, each connected to respective transmission and/or reception front-end modules.

6. The active electronically steerable antenna according to claim 1, wherein the respective base wall electronics of each of the plurality of three-dimensional U-shaped modules is implemented by discrete electronic components.

7. The active electronically steerable antenna according to claim 1, wherein the respective transmission and/or reception front-end modules of each of the plurality of three-dimensional U-shaped modules are implemented by packaged integrated circuits or discrete electronic components.

8. The active electronically steerable antenna according to claim 1, wherein the respective base wall and the respective side walls of each of the plurality of three-dimensional U-shaped modules are printed circuit boards.

9. The active electronically steerable antenna according to claim 1, wherein the respective three-dimensional U-shaped structure of each three-dimensional U-shaped module is enclosed in a respective three-dimensional U-shaped metallic structure including:
- a respective bottom mechanical support on which the respective base wall is mounted; and
- two respective side mechanical supports mounted externally to the respective side walls;
- wherein each of the plurality of three-dimensional U-shaped modules further comprises a respective central metallic structure that is mounted on or over the respective base wall between the respective side walls and is fitted with a respective air passage for air-cooling of said respective base and side walls and of the respective transmit and/or receive electronics.

10. The active electronically steerable antenna of claim 9, wherein the respective three-dimensional U-shaped structure of each of the plurality of three-dimensional U-shaped modules is elongated in a longitudinal direction that is orthogonal to planes on which U-shape of said three-dimensional U-shaped structure is defined; and
- wherein, for each of the plurality of three-dimensional U-shaped modules, also the respective bottom mechanical support, the respective side mechanical supports, the respective central metallic structure and the respective air passage are elongated in said longitudinal direction.

11. The active electronically steerable antenna according to claim 9, wherein, for each of the plurality of three-dimensional U-shaped modules, the respective side mechanical supports are provided with respective fins for further air-cooling of the respective side walls and of the respective transmission and/or reception front-end modules.

12. The active electronically steerable antenna according to claim 1, wherein the plurality of three-dimensional U-shaped modules are arranged side by side along a horizontal or vertical direction, or both horizontal and vertical directions; and wherein said plurality of three-dimensional U-shaped modules have one and the same size or have different sizes.

13. The active electronically steerable antenna according to claim 9, further including means configured to generate an air flow through the respective air passage of each three-dimensional U-shaped module for air-cooling thereof.

14. The active electronically steerable antenna of claim 13, wherein the air flow is generated:
- in one and the same direction for all the three-dimensional U-shaped modules; or
- in two opposite directions including a first direction for some of the three-dimensional U-shaped modules and a second opposite direction for the other three-dimensional U-shaped modules.

* * * * *